(12) United States Patent
Shields

(10) Patent No.: US 11,868,846 B1
(45) Date of Patent: Jan. 9, 2024

(54) QUANTUM COMPUTING SIMULATION USING COMPARATIVE REJECTION SAMPLING

(71) Applicant: Amazon Technologies, Inc., Seattle, WA (US)

(72) Inventor: Dylan Thomas Shields, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 551 days.

(21) Appl. No.: 16/909,938

(22) Filed: Jun. 23, 2020

(51) Int. Cl.
| | |
|---|---|
| G06N 10/00 | (2022.01) |
| G06F 11/34 | (2006.01) |
| G06F 11/26 | (2006.01) |
| G06N 7/01 | (2023.01) |

(52) U.S. Cl.
CPC .......... G06N 10/00 (2019.01); G06F 11/261 (2013.01); G06F 11/3428 (2013.01); G06F 11/3457 (2013.01); G06N 7/01 (2023.01)

(58) Field of Classification Search
CPC .... G06N 10/00; G06N 7/005; G06F 11/1076; G06F 11/261; G06F 11/3428; G06F 11/3457
See application file for complete search history.

(56) References Cited

U.S. PATENT DOCUMENTS

| | | | |
|---|---|---|---|
| 9,774,401 B1* | 9/2017 | Borrill | H04L 9/0852 |
| 10,031,791 B1* | 7/2018 | Wallman | G06N 10/00 |
| 10,984,152 B2* | 4/2021 | Rubin | G06F 9/455 |
| 2019/0042974 A1* | 2/2019 | Daraeizadeh | G06F 30/3308 |
| 2019/0095561 A1* | 3/2019 | Pednault | G06N 10/00 |
| 2019/0121921 A1* | 4/2019 | Nam | G06N 10/20 |
| 2019/0340532 A1* | 11/2019 | Ducore | G06F 8/443 |
| 2020/0184024 A1* | 6/2020 | Nam | G06F 30/327 |
| 2020/0327269 A1* | 10/2020 | Pond | G06N 10/00 |
| 2020/0334107 A1* | 10/2020 | Katabarwa | G06N 10/00 |
| 2021/0081804 A1* | 3/2021 | Stojevic | G16B 40/30 |

(Continued)

FOREIGN PATENT DOCUMENTS

| | | | | |
|---|---|---|---|---|
| WO | 2019222748 A1 | | 11/2019 | |
| WO | WO-2020072819 A1 | * | 4/2020 | G06N 10/00 |

OTHER PUBLICATIONS

Igor L. Markov, et al., "Quantum Supremacy is Both Closer and Farther than It Appears", arXiv:1807.10749v3, Sep. 26, 2048. pp. 1-32.

(Continued)

*Primary Examiner* — Bryce M Aisaka
(74) *Attorney, Agent, or Firm* — Alexander A. Knapp; Kowert, Hood, Munyon, Rankin & Goetzel, P.C.

(57) ABSTRACT

A comparative rejection sampling technique selects a bound set of possible execution run results for a process to be simulated, such as a quantum circuit, for each possible execution run result a modeled probability of a state associated with the possible execution run result is determined. For example a tensor network algorithm may be used to determine quantum state probabilities for each quantum state execution result included in the bound set. Based on the determined probabilities one of the possible execution run results is selected from the set of possible execution run results as an accepted simulated execution run result for a run of the process being simulated.

20 Claims, 16 Drawing Sheets

(56) References Cited

U.S. PATENT DOCUMENTS

| | | | |
|---|---|---|---|
| 2021/0089955 A1* | 3/2021 | Bondesan | G06N 3/04 |
| 2021/0342730 A1* | 11/2021 | Redmond | G06N 10/60 |
| 2021/0398621 A1* | 12/2021 | Stojevic | G16C 10/00 |
| 2022/0108218 A1* | 4/2022 | Wall | G06N 5/003 |
| 2022/0147667 A1* | 5/2022 | Motta | G06N 10/00 |
| 2022/0198246 A1* | 6/2022 | Hibat Allah | G06N 3/0445 |
| 2022/0222567 A1* | 7/2022 | Reagor | H01L 39/14 |
| 2022/0230087 A1* | 7/2022 | Castrillo | G06N 10/40 |
| 2022/0245499 A1* | 8/2022 | Schutski | G06N 10/60 |
| 2022/0245574 A1* | 8/2022 | Cella | G06F 9/451 |
| 2022/0269973 A1* | 8/2022 | Kelly | G06N 10/00 |

OTHER PUBLICATIONS

U.S. Appl. No. 16/698,674, filed Nov. 27, 2019, Jeffrey Heckey et al.
U.S. Appl. No. 16/698,698, filed Nov. 27. 2019, Derek Bolt et al.
U.S. Appl. No. 16/698,732, filed Nov. 27, 2019, Jeffrey Heckey et al.
U.S. Appl. No. 16/698,737, filed Nov. 27, 2019, Christopher Kasprowicz et al.

* cited by examiner

Sample Simulated Execution Run Results and Associated Probabilities to be Tested (e.g. 10,000 Samples)

Sample Simulated Execution Run Results and Associated Probabilities to be Tested with Probability Distribution Function Overlaid (e.g. 10,000 Samples)

QUANTUM COMPUTING SIMULATION USING COMPARATIVE REJECTION SAMPLING

BACKGROUND

Quantum computing utilizes the laws of quantum physics to process information. Quantum physics is a theory that describes the behavior of matter at the fundamental level. It is currently the only physical theory that is capable of consistently predicting the behavior of microscopic quantum objects like photons, molecules, atoms, and electrons.

A quantum computer is a device that utilizes quantum physics/quantum mechanics to allow one to write, store, process and read out information encoded in quantum states, e.g. the states of quantum objects. A quantum object is a physical object that behaves according to the laws of quantum physics. The state of a quantum object is a description of the object at a given time.

In quantum physics/quantum mechanics, the state of a two-level quantum system, or simply, a qubit, is a list of two complex numbers whose squares sum up to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g. a traditional zero or one bit) and the qubit is that a probabilistic bit represents a lack of information about a two-level classical system, while a qubit contains maximal information about a two-level quantum system. For example, a qubit may include information about probabilities for more than just one state, whereas a traditional bit describes just one state, e.g. a zero or a one.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a pair of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms. Also, costs, run-times, error rates, availability, etc. may vary across quantum computing technologies.

A quantum computer simulation may use a tensor network algorithm that models quantum gates and the arrangement of quantum gates of a quantum circuit to simulate results of executing a run on a quantum computer. Different tensor network algorithms may be used to simulate different types of quantum computers.

Figure 1:
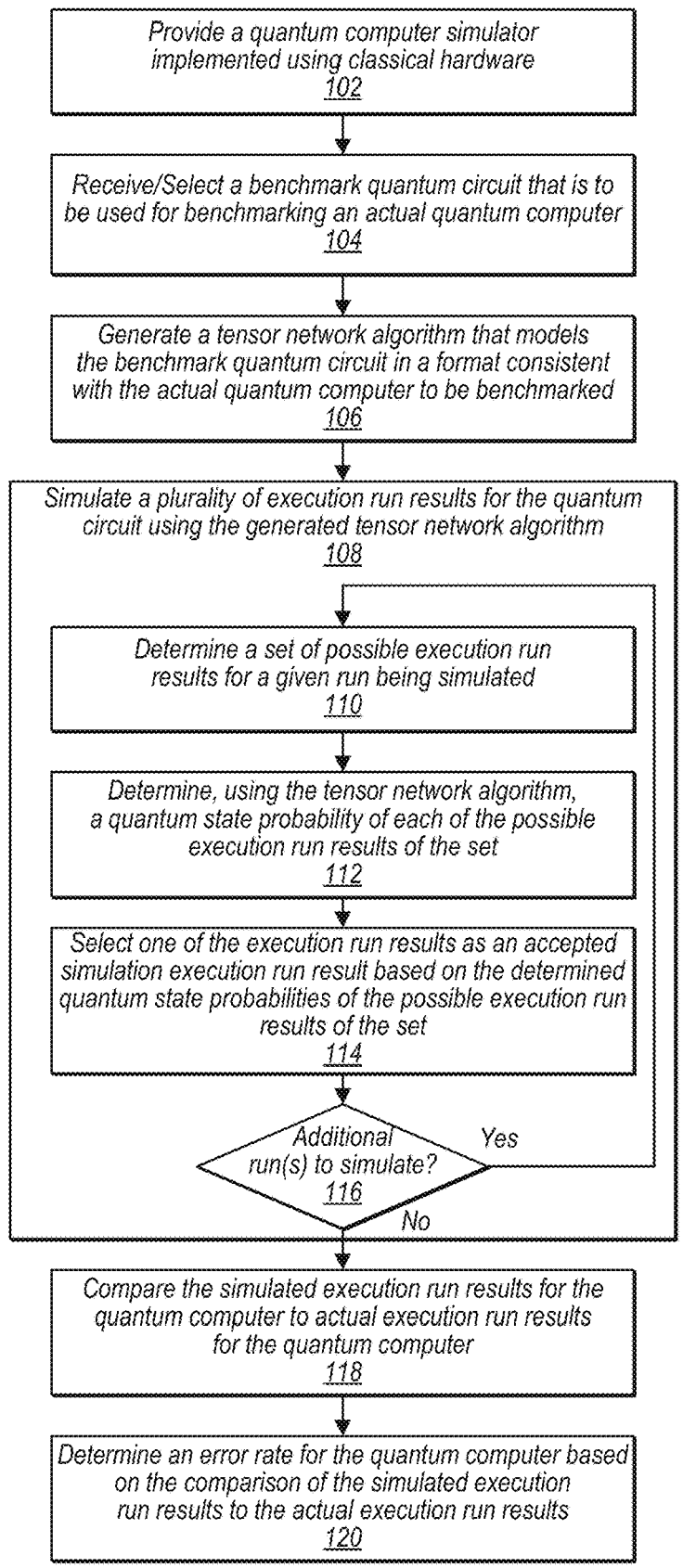
FIG. 1 illustrates a process of determining an error rate for a quantum circuit using simulated execution run results generated using a comparative rejection sampling technique, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for providing simulated quantum computing results using a comparative rejection sampling technique. Also in some embodiments, a system that provides simulated quantum computing results using a comparative rejection sampling technique may also provide other quantum computing services to customers, such as providing customers access to multiple different quantum computing technologies and enabling customers to seamlessly use the different quantum computing technologies without requiring the customers to have specific knowledge of the underlying quantum computing technologies.

In some embodiments, a system includes one or more computing devices configured to implement a quantum computing service that is configured to determine benchmark data for two or more quantum computing hardware providers associated with the quantum computing service. The quantum computing service is also configured to provide, to a customer of the quantum computing service, the benchmark data for the two or more quantum computing hardware providers for use in selecting a quantum hardware provider to execute a quantum circuit on behalf of the customer. To determine the benchmark data for each of the two or more quantum computing hardware providers, the one or more computing devices implementing the quantum computing service are configured to simulate execution run results of the benchmark quantum circuit, cause actual runs of the benchmark quantum circuit to be executed on quantum computing hardware of the quantum hardware providers associated with the quantum computing service, and compare the simulated execution run results to the actual execution run results.

Additionally, the one or more computing devices that implement the quantum computing service are configured to generate a tensor network algorithm modelling the benchmark quantum circuit and simulate, using the generated tensor network algorithm, a plurality of execution run results for a plurality of execution runs of the benchmark quantum circuit, wherein the benchmark quantum circuit and corresponding tensor network algorithm are translated into a format specific to a quantum hardware provider being evaluated. Also, the one or more computing devices are configured to cause a plurality of actual execution runs of the benchmark quantum circuit to be performed on the quantum computer of the respective quantum computing hardware provider being evaluated, wherein the benchmark quantum circuit is translated into the format specific to the respective quantum hardware provider being evaluated. Using the simulated execution results and the actual execution results, the one or more computing devices that implement the quantum computing service are configured to determine an error rate for the respective quantum computers of the respective quantum computing hardware providers being evaluated.

To simulate the plurality of execution run results, the one or more computing devices implementing the quantum computing service are configured to, for each of the simulated execution runs, determine a set of possible execution run results for the benchmark quantum circuit executed on the quantum computer of the respective quantum computing hardware provider being evaluated for the respective execution run, determine respective probabilities for each of the possible execution run results of the set for the respective execution run, wherein the probabilities are determined based on applying each of the respective possible execution run results of the set to the tensor network algorithm for the quantum computer of the respective quantum computing hardware provider being evaluated to determine the respective probabilities, and select, as a simulated execution result for the simulated execution run, one of the set of possible execution run results from the set of possible execution results, wherein the selected simulated execution result is selected from the set based on its determined probability relative to the determined probabilities of the other possible execution results of the set.

In some embodiments, in order to determine the tensor network algorithm and/or to generate a version of the benchmark quantum circuit formatted in accordance with a given quantum hardware provider being evaluated, the quantum computing service is configured to translate the benchmark quantum circuit into a selected quantum circuit format for a particular quantum computing technology of the quantum hardware provider being evaluated, wherein the selected quantum circuit format for the particular quantum computing technology is one of a plurality of quantum circuit formats for a plurality of different quantum computing technologies supported by quantum hardware providers associated with the quantum computing service.

In some embodiments, to translate the benchmark quantum circuit into the selected quantum circuit format, the one or more computing devices that implement the quantum computing service are configured to identify portions of the benchmark quantum circuit corresponding to quantum operators, substitute the quantum operators of the benchmark quantum circuit represented in an intermediate representation with quantum operators of the quantum circuit format of the particular quantum computing technology, and perform one or more optimizations to reduce an overall number of quantum operators in a translated version of the benchmark quantum circuit that is a translated version of the benchmark quantum circuit represented in an intermediate representation, wherein the intermediate representation is a generic representation of the benchmark quantum circuit that is not necessarily specific to any one particular one of the quantum hardware providers associated with the quantum computing service.

In some embodiments, a quantum operator included in a quantum object, such as a benchmark quantum circuit, may correspond with a quantum gate. Also, in some embodiments, optimization may reduce an overall number of quantum operators and may include reducing an overall number of quantum gates included in the translated benchmark quantum circuit.

Additionally, the quantum computing service is configured to provide the translated benchmark quantum circuit for execution at the quantum hardware provider being evaluated that uses the particular quantum computing technology; receive, from the quantum hardware provider being evaluated, results of the execution of the translated benchmark quantum circuit; and store the execution run results of the benchmark quantum circuit executed on the quantum computer of the quantum hardware provider being evaluated. This process may also be repeated for one or more other quantum hardware providers being evaluated. The stored results may then be compared against simulated execution run results for each of the quantum hardware providers being evaluated to determine respective error rates of the quantum computers of the quantum hardware providers being evaluated.

In some embodiments, the quantum computing service may be included in a larger service provider network. Thus, in some embodiments the system may include one or more computing devices of a service provider network configured to implement the quantum computing service. The system may also include a first edge computing device of the service provider network located at a location of a first quantum hardware provider and one or more other edge computing devices of the service provider network located at one or more locations of one or more other quantum hardware providers. The first quantum hardware provider and the one or more other quantum hardware providers may be configured to execute quantum computing circuits using quantum computers based on different quantum computing technologies. Additionally, the first edge computing device and the one or more other edge computing devices may each be configured to instantiate a virtual machine implemented on classical computing hardware of the respective edge computing device and receive, via the quantum computing service, a quantum circuit to be executed on respective quantum computers of the quantum hardware providers, such as a translated benchmark quantum circuit.

Also, the edge computing devices may each be configured to submit results generated from executing a quantum circuit on a quantum computer of a quantum hardware provider to a data storage system of the service provider network, wherein one or more computing devices implementing the data storage system are located at a facility of the service provider network remote from the location of the respective quantum hardware providers.

In some embodiments, a virtualized computing service may be among a plurality of network-accessible services (e.g., including storage services, database services, etc.) implemented at a service provider network or in a cloud computing environment offered by a service provider network.

In some embodiments, a method of performing a comparative rejection simulation includes determining a set of possible execution run results for a quantum computer. The method also includes determining respective probabilities for each of the possible execution run results based on applying each of the respective possible execution run results to a tensor network algorithm that models a quantum circuit to be executed on the quantum computer. Additionally, the method includes selecting, as a simulated execution result, one of the set of possible execution run results from the set of possible execution results, wherein the selected simulated execution result is selected from the set based on its determined probability relative to the determined probabilities of the other possible execution run results of the set.

In some embodiments, one or more non-transitory computer-readable media store program instructions that when executed on or across one or more processors, cause the one or more processors to determine a set of possible execution run results for execution of a quantum circuit. The program instructions, when executed, also cause the one or more processors to determine respective probabilities for each of the possible execution run results based on applying each of the respective possible execution run results to a tensor network algorithm that models the quantum circuit in a format supported by a particular quantum hardware provider. Additionally, the program instructions, when executed, cause the one or more processors to select, as a simulated execution result, one of the set of possible execution run results, wherein the selected simulated execution result is selected from the set based on its determined probability relative to the determined probabilities of the other possible execution run results of the set.

Quantum hardware providers, such as those associated with a quantum hardware service and/or non-affiliated quantum hardware providers, may frequently update, calibrate, and/or modify their respective quantum computers. Because of these frequent changes, benchmarking results may quickly become obsolete. For example, benchmarking results for a quantum computer performed on a given day when the quantum computer is recently calibrated may quickly become obsolete after a few days as the quantum computer varies from the calibrated state. Therefore a customer of a quantum computing service selecting a quantum hardware provider to use to execute a quantum circuit on behalf of the customer may want to perform up-to-date benchmarking to determine respective error rates of one or more quantum hardware providers that may potentially be selected to execute the customer's quantum circuit. Note that while benchmarking is described herein in terms of benchmarking quantum hardware providers associated with a quantum computing service, in some embodiments un-affiliated quantum hardware providers may also be benchmarked by executing a benchmark quantum circuit on a quantum computer of the un-affiliated quantum hardware provider and comparing the actual execution run results to simulated execution results simulated via a simulation service of a quantum computing service, as described herein.

Also, because quantum computers may begin to vary from a calibrated state quickly after calibration, a customer that has already selected a quantum hardware provider may desire to periodically repeat benchmarking of the quantum hardware provider and/or a quantum computer of the quantum hardware provider to ensure the quantum hardware provider is continuing to provide results within an acceptable error rate.

Moreover, because benchmarking of quantum hardware providers or a selected quantum hardware provider may be performed somewhat regularly, a duration of time required to perform the benchmarking may be an important consideration for a customer of a quantum computing service. For example, some simulation techniques used in benchmarking may require multiple hours and/or days to complete. Also, some simulation techniques used in benchmarking may fail to complete, and run indefinitely until aborted.

For example, a rejection sampling technique may select a sample to test at random and either accept or reject the sample by comparing a quantum circuit state probability of the sample against a threshold probability for a given state of the quantum circuit. However, in such a simulation technique, if the threshold probability for a given state or states of the quantum circuit are very low, and/or non-uniform, the rejection sampling technique may repeatedly evaluate sample after sample that are rejected. For example, in some cases 1,000 or more samples may be evaluated in order to return a single accepted sample. Also, in some situations with unusual probability distributions, the rejection sampling technique may fail to find a requested number of accepted samples and may run indefinitely without providing the requested number of simulated execution run results (e.g. accepted samples).

Some simulation schemes may utilize a frugal rejection sampling technique, wherein an acceptable range of probabilities is associated with respective states of the quantum circuit. This, technique may result in fewer samples needing to be tested to return an accepted sample, as compared to the rejection sampling technique. However, the frugal rejection technique may also lead to long duration evaluations and/or indefinite processing for quantum circuits with non-uniform or narrow probabilities. Also, increasing the range for acceptable samples may lead to erroneous samples being included as accepted samples, thus reducing the accuracy of the simulated results generated using a frugal rejection sampling technique.

In contrast to the rejection sampling technique and the frugal rejection sampling technique, a comparative rejection sampling technique may bound a number of possible samples that are required to be evaluated to return an accepted sample. For example, in a comparative rejection technique, a set of possible execution run results (e.g. output states of the quantum circuit being evaluated) may be selected, for example at random. For each possible execution run result of the set, a corresponding state probability may be calculated by applying the execution run result to a tensor network algorithm that models the quantum circuit being evaluated. Then, the probabilities of each of the possible execution run results may be used to select one of the possible execution run results of the set as an accepted simulated execution run result. For example, if the set includes ten possible execution run results, one of the ten possible execution run results will be accepted as the simulation execution run result. In this way only ten (or N) possible execution run results need to be evaluated to determine an accepted execution run result. For example, if 100 simulated execution run results are to be returned (k returned results), a number of possible execution results to be evaluated is bound and can be calculated as k*N. For example, 100 simulated results to be returned, and 10 possible execution results evaluated per accepted execution result would bound the number of possible execution results to be evaluated to return the 100 accepted simulated results at 1,000 total possible execution run results to be evaluated. In contrast, using the rejection sampling technique or the frugal rejection sampling technique, there is no bound on how many possible samples will need to be evaluated to return the 100 accepted simulation results, and it could be 2,000, 10,000, or any other number.

For example, FIGS. 2A-2G and FIGS. 3A-3B discussed below further illustrate the numbers possible execution run results to be evaluated in order to return a given number of accepted simulation results for both a rejection sampling technique and the comparative rejection sampling technique.

FIG. 1 illustrates a process of determining an error rate for a quantum circuit using simulated execution run results generated using a comparative rejection sampling technique, according to some embodiments.

At 102, a quantum computer simulator implemented using classical computing hardware is provided. For example, a quantum computing service may provide a quantum computing simulator as a service to customers of the quantum computing service. The customers may be able to submit quantum circuits, quantum algorithms, etc. to the simulator service and receive simulated execution run results. Also, the simulation service may be configured to simulate different types of quantum computers and may be configured to simulate results of particular quantum computers of particular quantum hardware providers associated with the quantum computing service.

At 104, the simulation service receives and/or selects a benchmark quantum circuit that is to be used for benchmarking an actual quantum computer of a quantum hardware provider. Note that in some embodiments, multiple actual quantum computers of one or more quantum hardware providers may be benchmarked. Also, in some embodiments, the benchmark quantum circuit to be simulated may be a random quantum circuit with superconducting qubits generated for circuit simulation. In some embodiments, a customer may provide a benchmarking quantum circuit to be simulated, or the quantum computing service may select or generate the benchmark quantum circuit to be simulated. For example, in some embodiments, the quantum computing service may use a stored algorithm to randomly generate the benchmark quantum circuit to be simulated, such that the randomly generated benchmark quantum circuit is comparable to benchmarks generally used to evaluate quantum computers.

Figure 8:
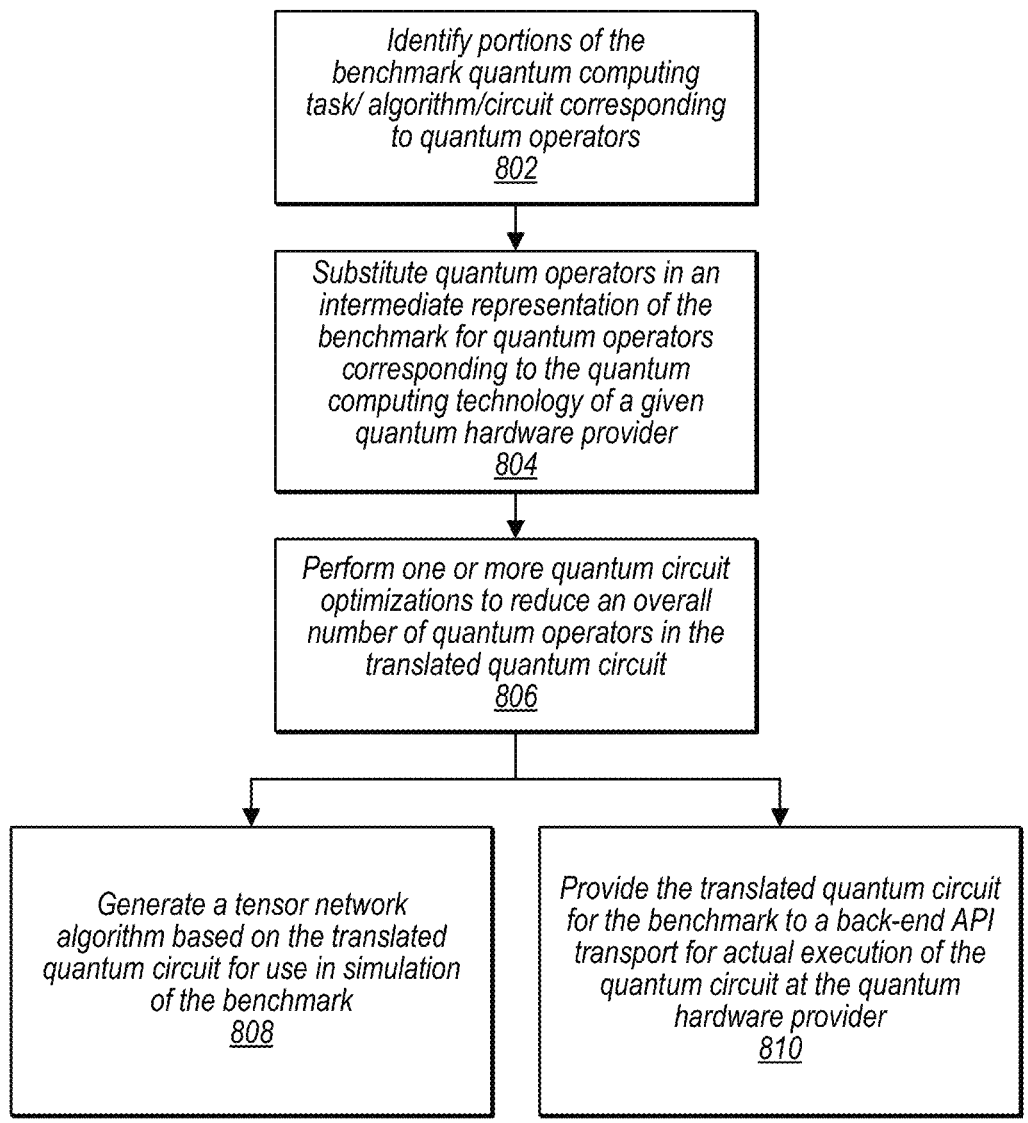
FIG. 8 illustrates a process of translating a quantum task/algorithm/circuit, such as a benchmark quantum circuit, defined in an intermediate representation not specific to any one particular quantum computer/quantum hardware provider into one or more translated quantum circuits specific to a particular quantum computer/quantum hardware provider, according to some embodiments.

At 106, the quantum computing service/quantum simulator uses the benchmark quantum circuit to generate a tensor network algorithm that models the benchmark quantum circuit in a format consistent with the actual quantum computer to be benchmarked. For example, the benchmark quantum circuit may be received or selected at 104, wherein the benchmark quantum circuit is formatted in an intermediate representation that is neutral to any particular quantum hardware provider and/or quantum computer. The benchmark quantum circuit represented in the intermediate representation may then be translated into a quantum circuit format used by a particular quantum computer and/or quantum hardware provider. For example, FIG. 8 provides additional details with regard to how a quantum circuit/quantum algorithm represented in an intermediate representation may be translated into a format particular to a particular quantum computer and/or quantum hardware provider. The translated benchmark quantum circuit may then be used as the basis for the tensor network algorithm. Also, the translated benchmark quantum circuit may be submitted for actual execution on the quantum computer being evaluated.

At 108, simulated execution run results are generated for the translated benchmark quantum circuit. For example, steps 110 through 116 describe utilizing steps for simulating an execution run for the translated benchmark quantum circuit using a comparative rejection technique to perform the simulation of 108.

At 110, as a part of performing a comparative rejection simulation for a given "run" of simulating execution of the quantum circuit, a set of possible execution results for the given run are determined.

In some embodiments, the set of possible execution run results for the given run may be determined at random from a state space of possible execution run results of the quantum circuit. For simplicity, consider a two-qubit quantum circuit. The two-qubit quantum circuit may produce run results of a) 1 0 0 0, b) 0 1 0 0, c) 0 0 1 0, and d) 0 0 0 1. For quantum circuits with a greater number of qubits, the number of possible execution run results may be given by $2^N$, where "N" is the number of qubits in the quantum circuit being simulated. For example, for a quantum circuit with 36 qubits, the number of possible execution results is $2^{36}$ or 68, 719, 476, 736. As can be seen for quantum circuits with a considerable number of qubits the number of possible execution results is exponentially large. Thus, it is impractical to compute every possible execution run result, such as the over 68 billion possible execution results for the 36 qubit quantum circuit. Instead, in a comparative rejection sampling technique, a set of possible execution run results is randomly selected from the domain of possible execution run results and state probabilities are only calculated for the smaller number of possible execution run results selected to be included in the set.

For example, for the 36 qubit quantum circuit, a set of ten possible execution run results may be randomly selected from the state domain of over 68 billion possible execution run results. Note that in comparison, a rejection sampling technique and a frugal rejection sampling technique may select an individual possible execution run result to test from the domain of possible execution run results (e.g. from the 68 billion possible execution run results for the 36 qubit quantum circuit) and may either accept or reject the sample after calculating a state probability for the sample. However, depending on which samples are selected to be evaluated and the probability distribution for the quantum circuit being simulated, the rejection sampling technique and the frugal rejection sampling technique may repeatedly select samples that are rejected, thus requiring potentially 100 s, 1,000 s, 10,000 s, or more samples (e.g. of the over 68 billion possible samples) to be evaluated before finding a single accepted sample. This process may utilize significant computing resources and prolong a duration of time required for the simulation. In contrast, in the comparative rejection sampling technique, the number of samples to be evaluated to determine an accepted sample is bound by the number of possible execution run results included in the set selected at 110.

At 112, the tensor network algorithm generated at 106 for the benchmark quantum circuit translated into the format of the particular quantum computer/quantum computer hardware provider being evaluated is used to determine a probability amplitude (e.g. complex amplitude or state probability) for each of the respective possible execution run results. For example, in the case where ten possible execution run results are included in the set, a probability amplitude of the quantum circuit being in each of the states associated with the ten possible execution run results is calculated using the tensor network algorithm, wherein each of the probability amplitudes corresponds to a respective one of the possible execution run results.

At 114, a single one of the possible execution run results is selected from the set of possible execution run results based on comparing the probability amplitudes of the possible execution run results of the set to one another. For example, in some embodiments, the possible execution run result with the greatest associated probability amplitude may be selected. In some embodiments, the probability amplitudes may be normalized and each possible execution run result may be weighted based on its normalized probability amplitude. Then one of the possible execution run results may be randomly selected based on the weighted normalized probability amplitudes. For example, if there are ten possible execution run results, the probabilities may be normalized and the execution run results may be weighted, such that a given one of the possible execution run results with a normalized probability of 30% is likely to be randomly selected 30% of the time, whereas another one of the ten possible execution run results with a normalized probability of 10% is likely to be randomly selected 10% of the time.

At 116, it is determined if there are additional runs to simulate. If so, the process reverts to 110. For example, a simulation request may request 1,000 simulated run results. Thus, the process of 110 to 114 may be repeated 1,000 times to generate the 1,000 simulated run results. If there are not additional run results to simulate for the quantum computer/quantum hardware provider being evaluated, the process proceeds to 118.

In some embodiments, a number of possible execution run results to include in a set at 110 may be determined based on a fidelity of the quantum computer being simulated. For example, the simulation needs to have a comparative fidelity as the quantum computer being simulated. While, quantum computer calibration, modifications, etc. are updated relatively frequently, quantum computer fidelity generally changes less frequently. Thus, a fidelity for the quantum computer being simulated can be assumed, wherein the assumed fidelity overshoots the likely actual fidelity by a margin of safety. As described herein, fidelity relates to the closeness between quantum states, wherein for two quantum states, one of the quantum states could be interpreted as the other. For example, of the possible execution run results, one of the execution run results would be so close to another one of the execution run results such that one could be interpreted as the other, when reading execution run results from the quantum computer being tested.

For example, in some embodiments, based on fidelities of current quantum computers, a set of possible execution run results may be bound to include ten samples. As quantum computers increase in fidelity, the set may be adjusted for future simulations to be bound by a different number of possible samples, such as 100 possible execution run result samples. However, the number of possible samples that bounds a comparative rejection sampling technique may be less than a number of samples required to be tested to generate an accepted sample using a rejection sampling technique, in some embodiments.

At 118, the simulated run results determined at 108 (e.g. by performing steps 110 through 116 for multiple runs) are compared to actual execution run results for the quantum computer. For benchmarking purposes, the simulated results are considered to be reference results to which the actual computed results are compared to determine errors. For example, quantum state fidelity of quantum computers is typically lower as compared to simulated results. Thus, deviations between the two can be assumed to be errors in the quantum computer. For example, errors in actual quantum computers often result from de-phasing of qubits and de-polarization of qubits. This is because with existing quantum computer technology it is difficult to control qubits. Such errors can be detected by comparing the actual execution run results to the simulated execution run results for the same benchmark quantum circuit.

At 120, an error rate for the quantum computer being evaluated is determined based on the comparison of the simulated execution run results and the actual execution run results. In some embodiments, the error rate may be provided to a customer of a quantum computing service for use in selecting a quantum hardware provider to use to execution a quantum circuit on behalf of the customer. Also, in some embodiments, the quantum computing service may utilize the determined error rate to provide recommendations to one or more customers regarding which quantum hardware provider to utilize to execution a quantum circuit on behalf of the customer.

FIGS. 2A-2F are provided to visually illustrate rejection sampling for a quantum circuit with normally distributed state probabilities, as an example to compare with comparative rejection sampling.

Figure 2A:
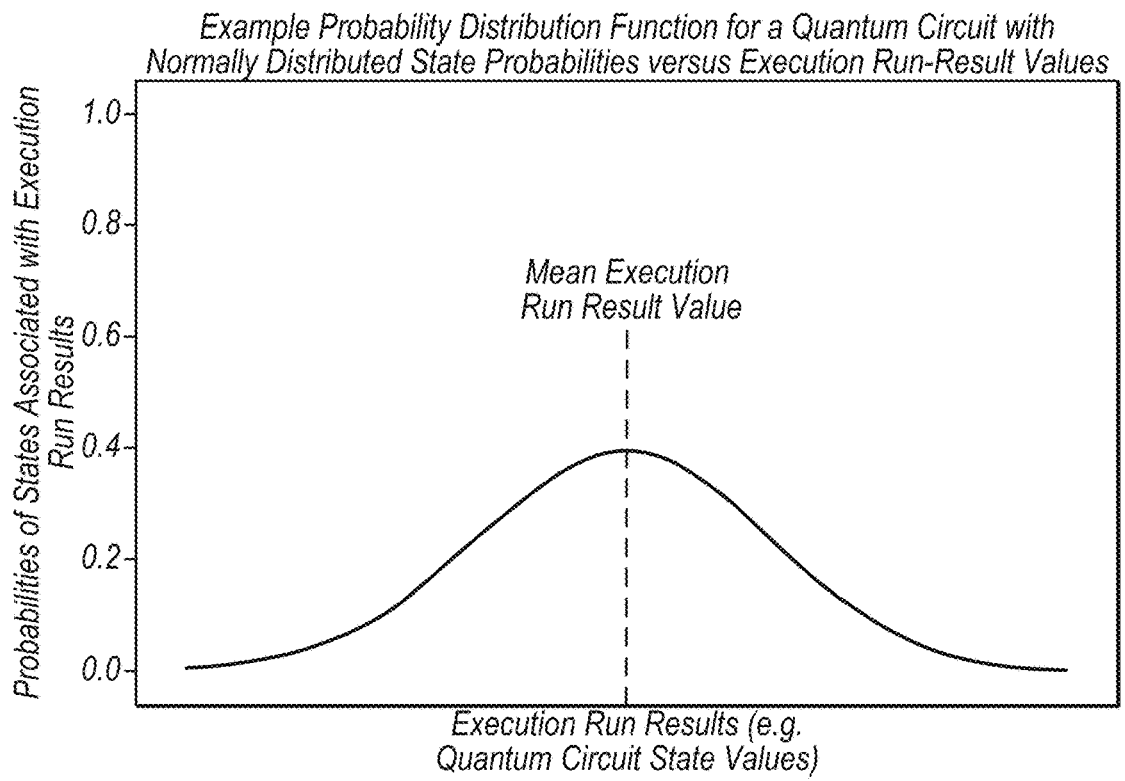
FIG. 2A illustrates an example probability distribution function of quantum state probabilities and execution run results for a quantum circuit, according to some embodiments.

FIG. 2A illustrates an example probability distribution function of quantum state probabilities and execution run results for a quantum circuit, according to some embodiments. For example, a quantum circuit being simulated may have a probability distribution function similar to the probability distribution function as shown in FIG. 2A. However, during simulation the shape of the probability distribution function may not be known. Also the range of quantum probabilities may not be known. For example, for a 36 qubit quantum circuit as discussed above, there may be over 68 billion possible execution results. Thus, it may be impractical to compute an associated quantum probability for each possible execution result and use the computed quantum probabilities and execution results to generate a probability function.

Figure 2B:
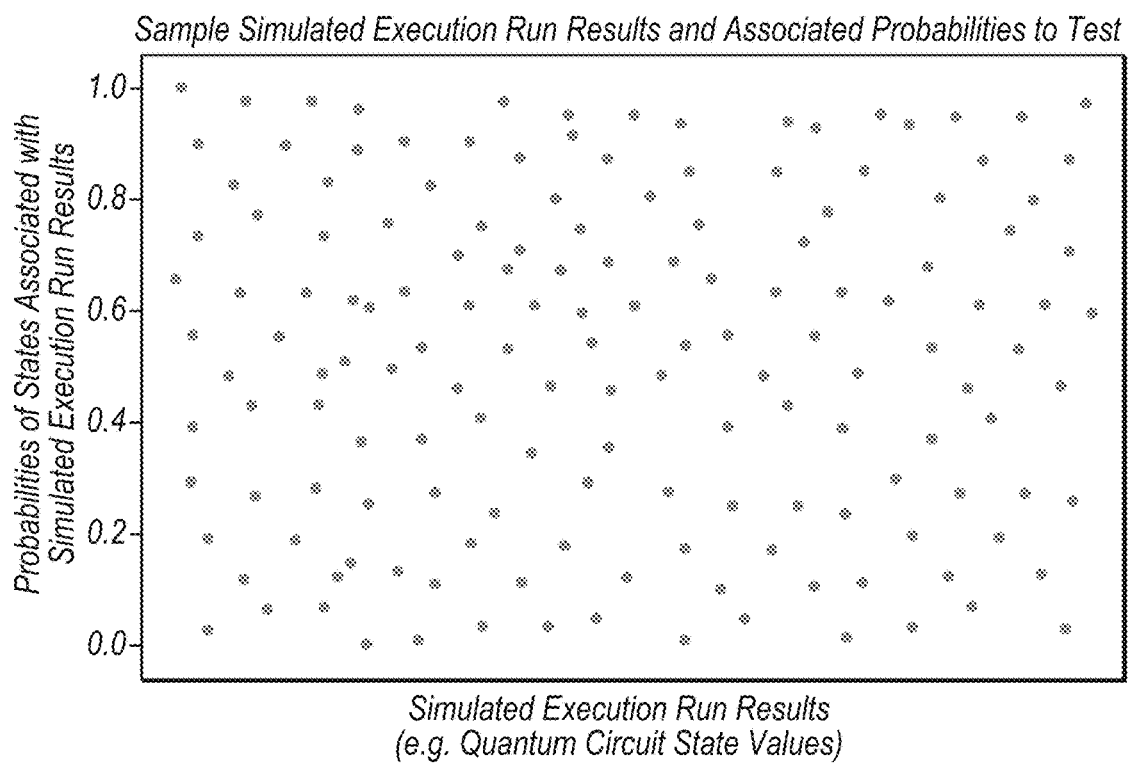
FIG. 2B illustrates example samples that may be tested for acceptance or rejection as part of simulating a quantum circuit, wherein the samples span a state space of a domain of possible state values to be returned by a quantum circuit (e.g. X-axis) and a range of possible quantum probabilities associated with the possible state values to be returned by the quantum circuit (e.g. Y-axis), according to some embodiments.

Instead, in a rejection sampling technique, samples falling within the state space domain (e.g. X-axis) and the probability range (e.g. Y-axis) of the quantum circuit being evaluated may be randomly selected. For example, FIG. 2B illustrates example samples that may be randomly selected and tested for acceptance or rejection as part of a rejection sampling technique for a quantum circuit, wherein the samples span a state space of a domain of possible state values to be returned by the quantum circuit (e.g. X-axis) and a range of possible probability amplitudes associated with the possible state values to be returned by the quantum circuit (e.g. Y-axis), according to some embodiments. Note that if there is little information known about the probability curve associated with the quantum circuit being simulated, the range of possible quantum state probabilities may span a full range from 0 to 1 (or 0% probability to 100% probability).

In the rejection sampling approach each sample comprises two randomly determined variables, e.g. an execution run result value and an associated quantum state probability (e.g. probability amplitude). For example, for the simplified two qubit circuit described above, one of the four possible execution run results may be selected at random and a probability that the quantum circuit will be in the state corresponding to the selected execution run result may be selected at random. For example, if nothing is known about the probability distribution function for the given quantum circuit being simulated, then the range of the possible probabilities that may be randomly assigned would span from 0 to 1. Also the possible execution run results would span the full domain of possible execution run results for the quantum circuit.

For example, if the full domain space and range is sampled, a large number of samples may be tested using the rejection sampling technique. For example, FIG. 2C illustrates the state space domain and state probability range of FIG. 2B filled with additional example samples to be tested for acceptance or rejection via a rejection sampling technique, according to some embodiments.

In the rejection sampling technique, each sample is then tested, by computing a state probability for the execution run result of the given sample via a tensor network algorithm. If the randomly determined state probability of the sample is within a threshold of the calculated state probability, then the sample is accepted. Otherwise, the sample is rejected. Repeatedly doing this for the full range of samples in the state domain and state probability range will reveal the probability distribution as shown in FIG. 2A, which is overlaid in FIG. 2D over the possible universe of samples from FIG. 2C.

Figure 2C:
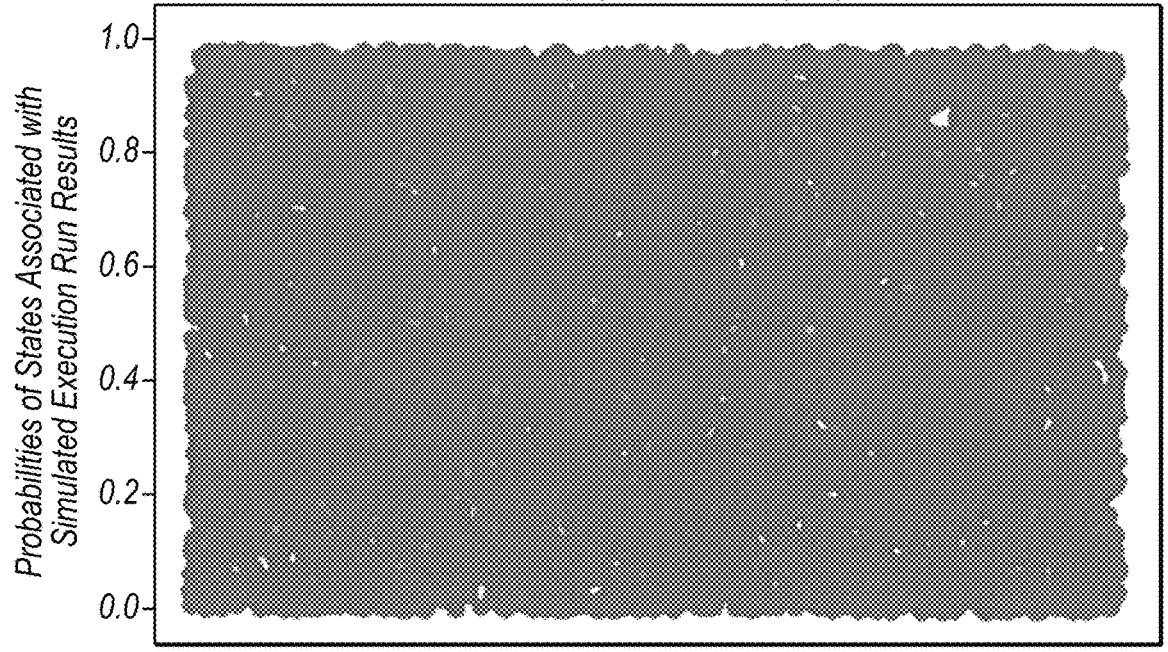
FIG. 2C illustrates the state space domain and range of FIG. 2B filled with additional example samples to be tested for acceptance or rejection, according to some embodiments.
Figure 2D:
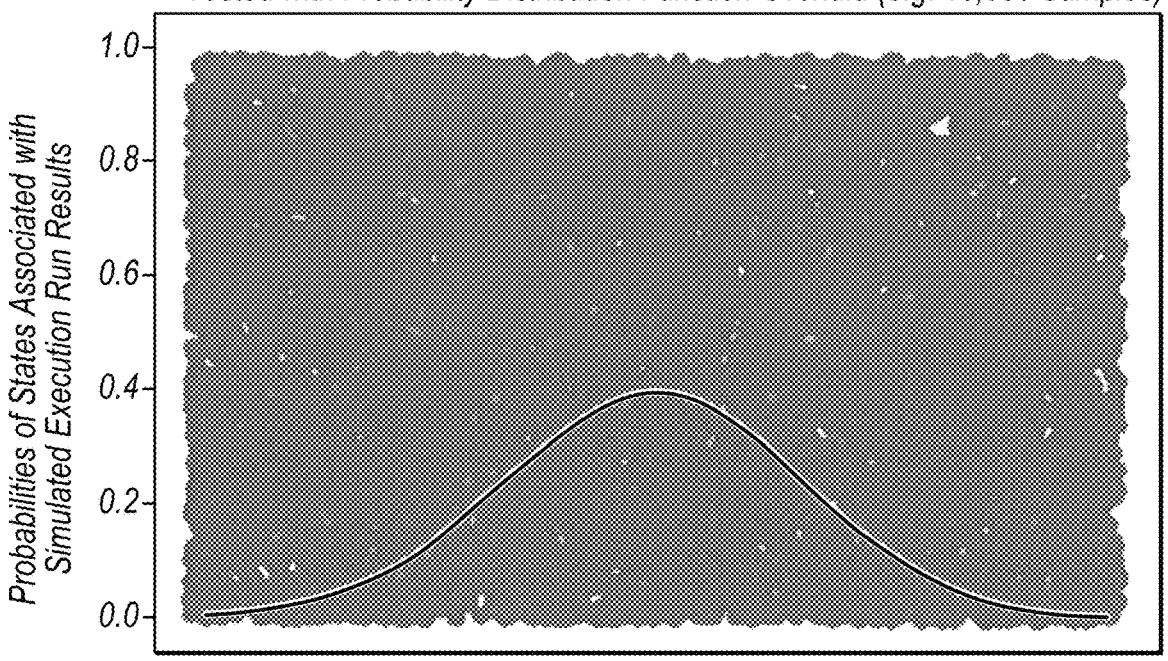
FIG. 2D illustrates the state space domain and range of FIG. 2C filled with the additional samples, wherein the probability distribution function of FIG. 2A has been overlaid over the samples to be tested, according to some embodiments.

For example, FIG. 2D illustrates the state space domain and range of FIG. 2C filled with the additional samples, wherein the probability distribution function of FIG. 2A has been overlaid over the samples to be tested, according to some embodiments.

The samples with associated randomly selected state probabilities that deviate from the calculated state probabilities determined via the tensor algorithm network by less than the threshold amount are accepted and the samples with associated state probabilities that deviate from the calculated state probabilities by more than the threshold amount are rejected.

Figure 2E:
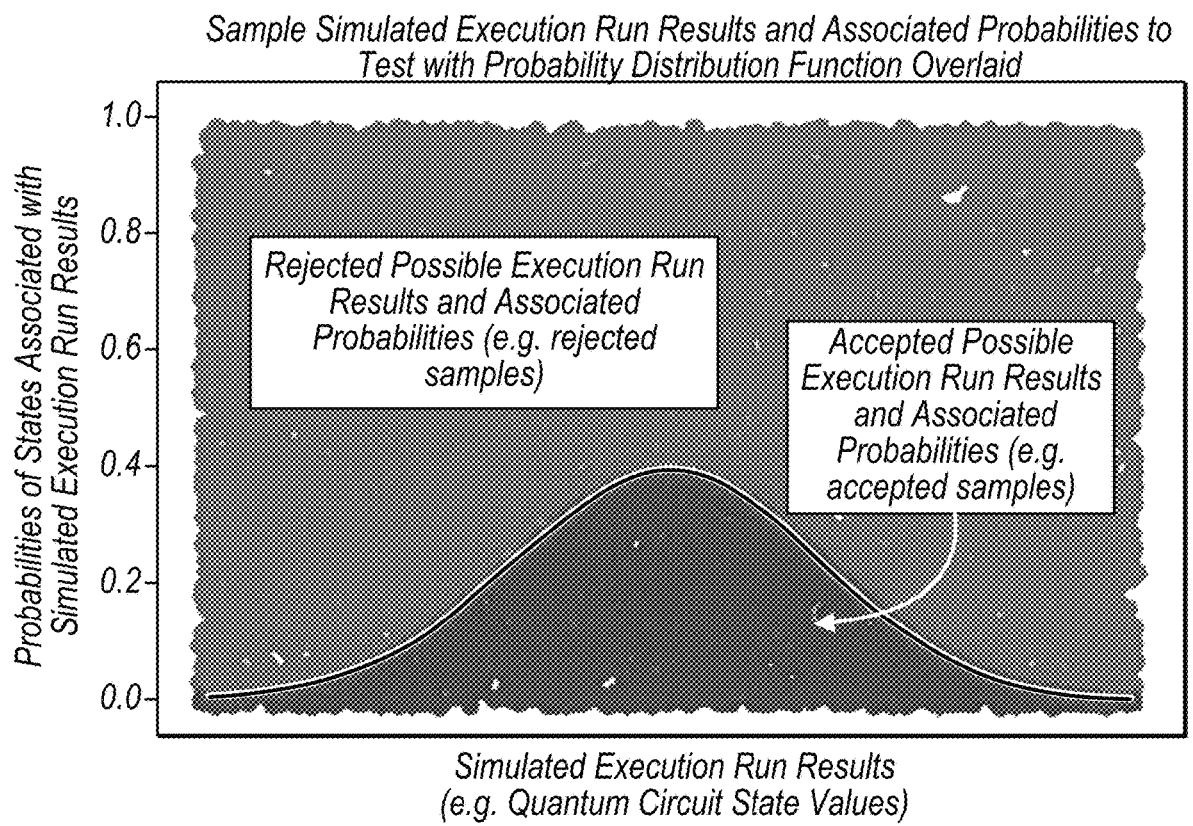
FIG. 2E illustrates the state space domain and range of FIG. 2D filled with additional example samples to be tested for acceptance or rejection, wherein samples outside of the probability distribution function are rejected and samples within the probability distribution function are accepted, according to some embodiments.

For example, FIG. 2E illustrates the state space domain and range of FIG. 2D filled with additional example samples to be tested for acceptance or rejection, wherein samples outside of the probability distribution function are rejected samples and samples within the probability distribution function are accepted samples.

However, the rejection sampling technique as described in FIGS. 2A-2E may require a large number of rejected samples to be processed in order to determine an accepted sample.

Figure 2F:
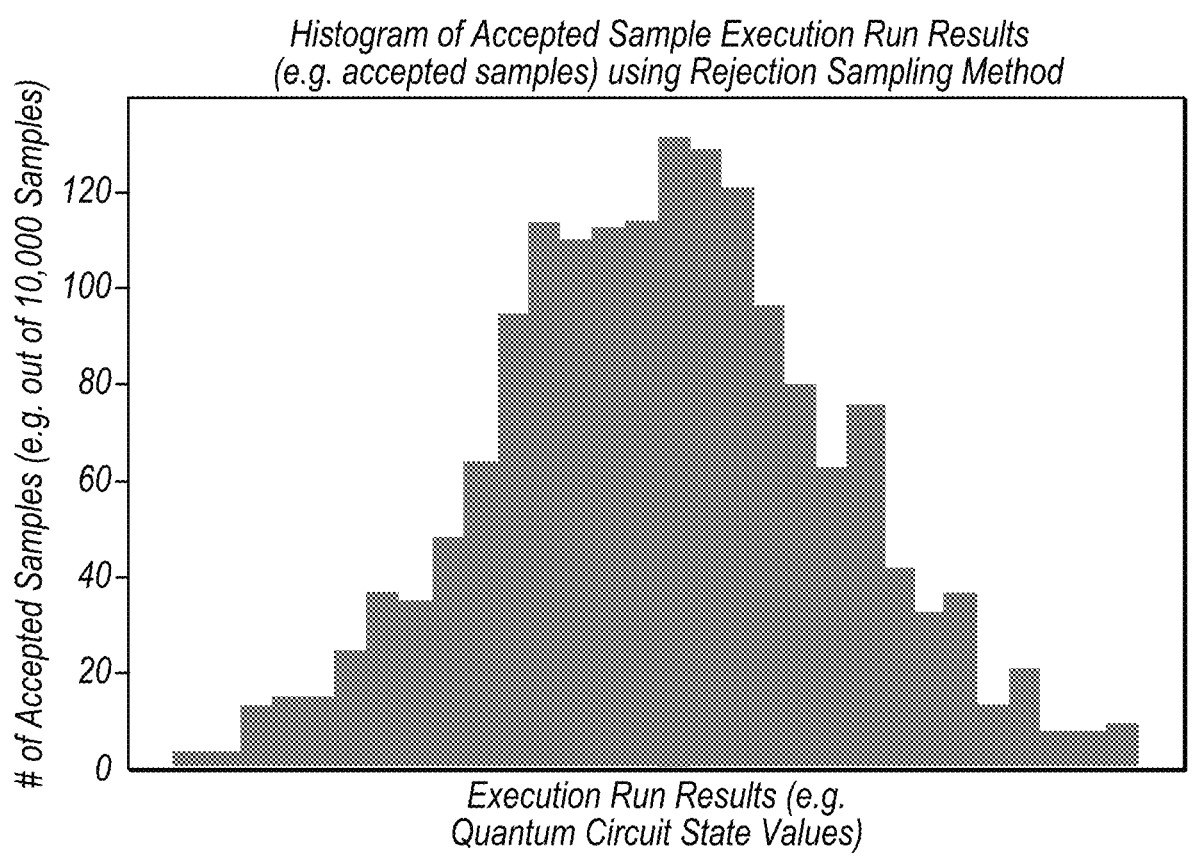
FIG. 2F illustrates a histogram of accepted samples having different execution run result values, wherein the accepted samples are determined using a rejection sampling technique, according to some embodiments.

For example, FIG. 2F illustrates a histogram of accepted samples having different execution run result values, wherein the accepted samples are determined using a rejection sampling technique, according to some embodiments. In FIG. 2F out of 10,000 samples tested 1,676 samples are accepted and 8,324 samples are rejected, as an example for the example selected quantum circuit. Thus, roughly six samples are required to be tested in order to generate a single accepted sample. Note that this is for a case where the probability distribution function was wide and uniform. If the probability distribution function for a given quantum circuit being simulated is non-uniform, spikey, narrow, etc. considerably more samples may be required to be tested via the rejection sampling technique to generate an accepted sample.

Figure 2G:
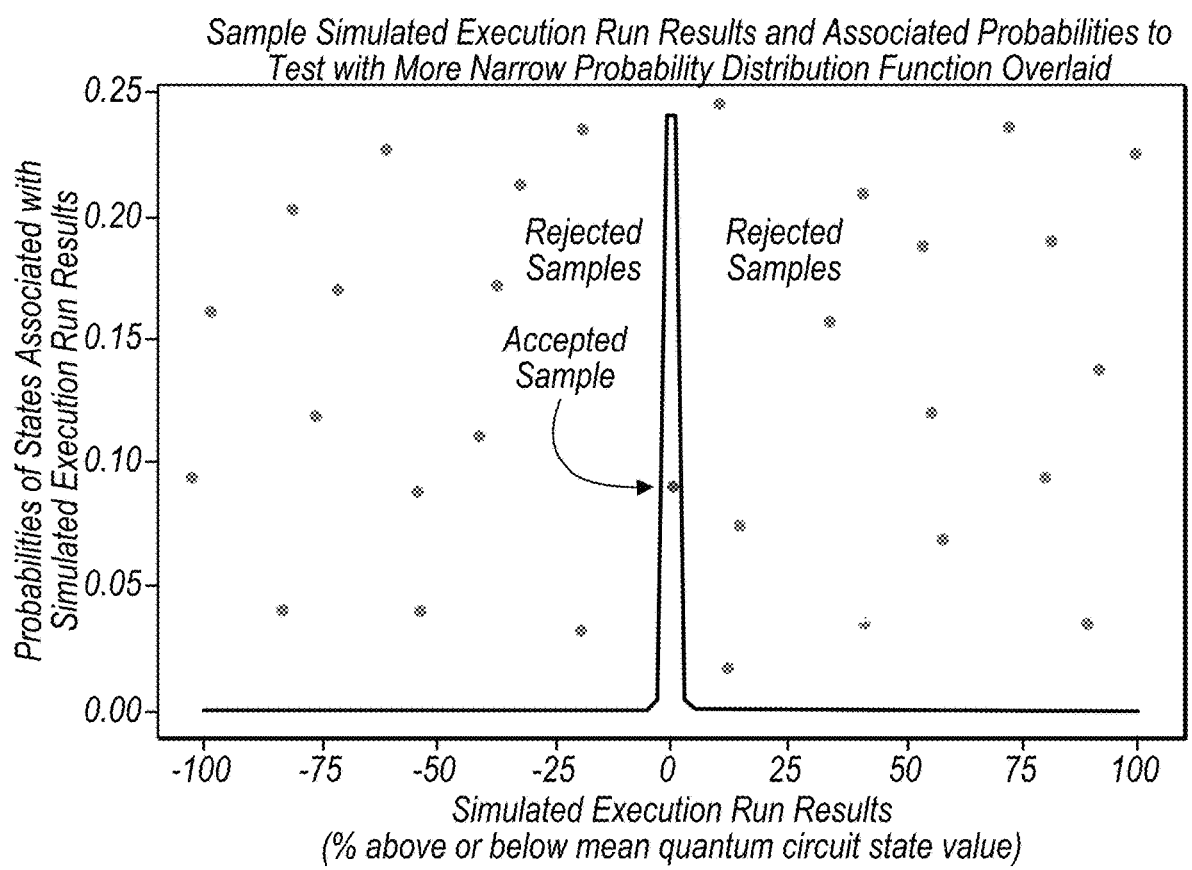
FIG. 2G, illustrates a state space domain and range for another quantum circuit to be simulated that has been filled with samples to be tested, wherein a more narrow probability distribution function for the other quantum circuit has been overlaid over the samples to be tested, according to some embodiments.

For example, FIG. 2G, illustrates a state space domain and range for another quantum circuit to be simulated that has been filled with samples to be tested, wherein a more narrow probability distribution function for the other quantum circuit has been overlaid over the samples to be tested.

For example, in the example illustrated in FIG. 2G, 29 samples are rejected and one sample is accepted. Thus, 30 samples need to be evaluated to yield one accepted sample using a rejection sampling technique.

In quantum computing it is often desirable to collapse the state of the quantum circuit on to a particular state (e.g. a particular execution run result value). This leads to a spikey distribution with a really high state probability at the execution run result value associated with the state upon which the quantum circuit collapses and very low probabilities for other execution run results in the state domain of the quantum circuit. For such quantum circuits, a rejection sampling technique may require a large number of samples to be tested to yield an accepted sample. Also, as a number of qubits included in a quantum circuit increases, the state domain of possible execution run results exponentially increases, which makes it even more difficult to identify accepted samples in the large domain and range of the quantum circuit using a rejection sampling technique.

In contrast to rejection sampling, comparative rejection sampling may limit a number of samples that need to be evaluated to determine an accepted sample, wherein the required number of samples is limited to a fixed number of samples (e.g. the number of samples "k" included as possible execution run results in the set of samples to be evaluated).

Figure 3A:
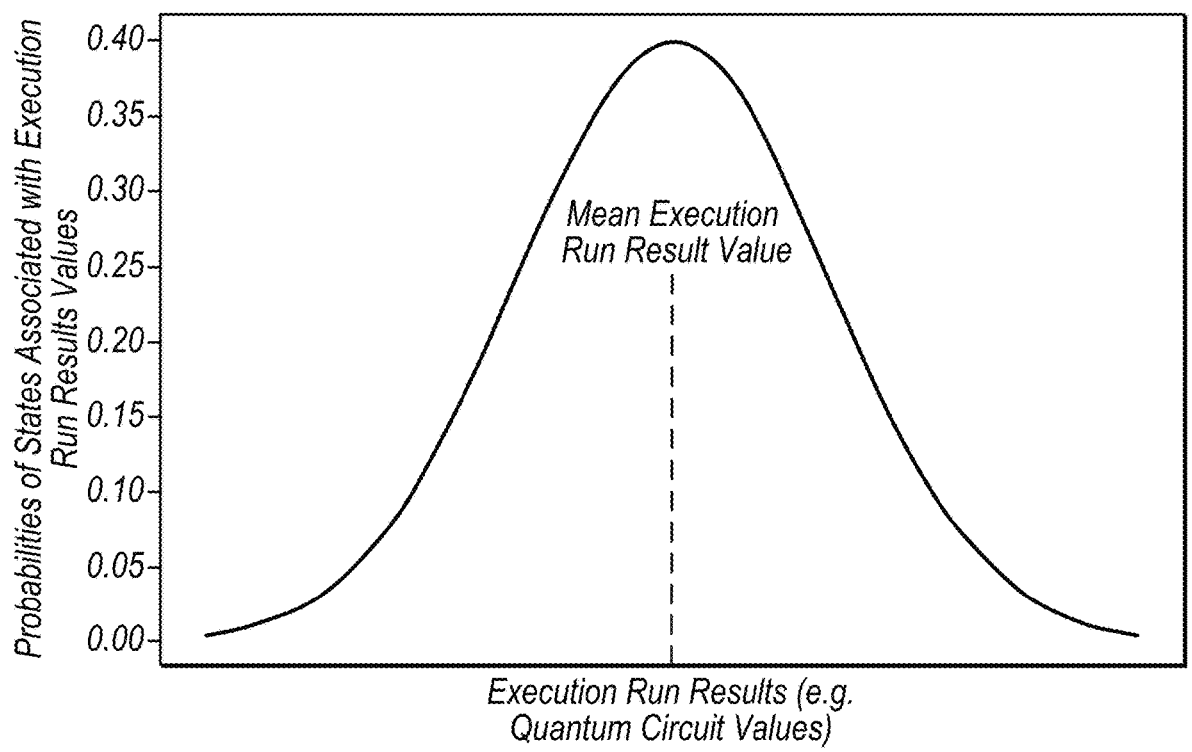
FIG. 3A illustrates an example probability distribution function of quantum state probabilities and execution run results for a quantum circuit to be simulated, according to some embodiments.

For example, FIG. 3A illustrates an example probability distribution function of quantum state probabilities and execution run results for a quantum circuit to be simulated using comparative rejection sampling, according to some embodiments. Note that the probability function of FIG. 3A and the probability function of FIG. 2A are similar in that the distribution is centered about the mean value and have uniform distributions. For example, using comparative rejection sampling with a set size of three (e.g. k=3), a histogram of accepted results may look like the histogram shown in FIG. 3B. Note, that this mirrors the probability function as shown in FIG. 3A (even though the probability function of the quantum circuit being simulated is not known when performing the comparative rejection sampling).

Figure 3B:
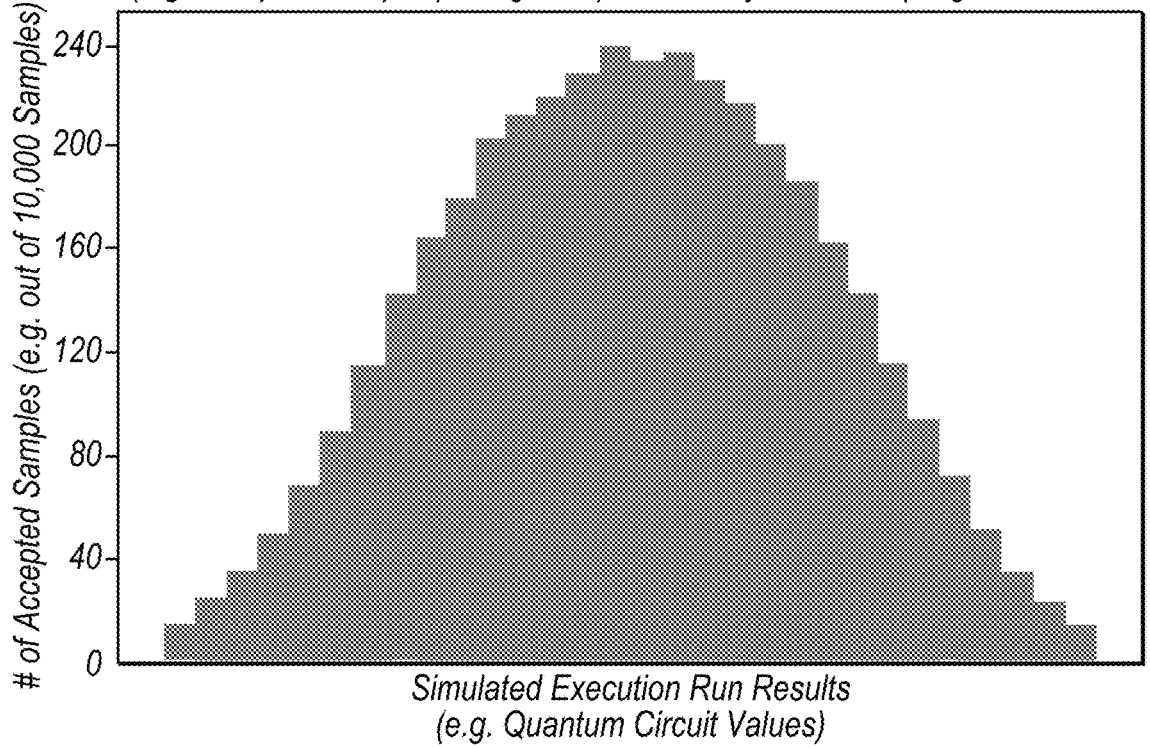
FIG. 3B illustrates a histogram of accepted samples having different execution run result values for a quantum circuit to be simulated, wherein the accepted samples are determined using a comparative rejection sampling technique, according to some embodiments.

For example, FIG. 3B illustrates a histogram of accepted samples having different execution run result values for a quantum circuit to be simulated, wherein the accepted samples are determined using a comparative rejection sampling technique, according to some embodiments.

Thus similar results or better results are simulated using the comparative rejection technique as compared to the rejection sampling technique, while only having to evaluate three samples per accepted sample, as compared to six samples per accepted sample using the rejection sampling technique for the example quantum circuit with the uniform distribution shown in FIGS. 2A and 3A. Note that for quantum circuits with non-uniform probability distributions and/or spikey probability distributions, the number of evaluated samples to generate an accepted sample using a rejection sampling technique would likely be much larger, whereas using the comparative rejection sampling technique the number of samples to be evaluated per accepted sample is bound by the number of possible samples included in the set.

Example Quantum Computing Service

As an alternative to building and maintaining a quantum computer, potential users of quantum computers may instead prefer to rely on a quantum computing service to provide access to quantum computers. Also, in some embodiments, a quantum computing service, as described herein, may enable potential users of quantum computers to access quantum computers based on multiple different quantum computing technologies and/or paradigms, without the cost and resources required to build or manage such quantum computers. Also, in some embodiments, a quantum computing service, as described herein, may provide various services that simplify the experience of using a quantum computer such that potential quantum computer users lacking deep experience or knowledge of quantum mechanics, may, never the less, utilize quantum computing services to solve problems.

Also, in some embodiments, a quantum computing service, as described herein, may be used to supplement other services offered by a service provider network. For example, a quantum computing service may interact with a classical computing service to execute hybrid algorithms. In some embodiments, a quantum computing service may allow a classical computer to be accelerated by sending particular tasks to a quantum computer for execution, and then further performing additional classical compute operations using the results of the execution of a quantum computing object on the quantum computer. For example, a quantum computing service may allow for the acceleration of virtual machines implemented on classical hardware in a similar manner as a graphics processing unit (GPU) may accelerate graphical operations that otherwise would be performed on a central processing unit (CPU).

In some embodiments, a quantum computing service may provide potential quantum computer users with access to quantum computers using various quantum computing technologies, such as quantum annealers, ion trap machines, superconducting machines, photonic devices, etc. In some embodiments, a quantum computing service may provide customers with access to at least three broad categories of quantum computers including quantum annealers, circuit-based quantum computers, and analog or continuous variable quantum computers. As used herein, these three broad categories may be referred to as quantum computing paradigms.

In some embodiments, a quantum computing service may be configured to provide simulation services using classical hardware based computing instances to simulate execution of a quantum circuit on a quantum computer. In some embodiments, a quantum computing service may be configured to perform general simulation and/or simulation that specifically simulates execution of a quantum circuit on a particular type of quantum computer of a particular quantum computer technology type or paradigm type. In some embodiments, simulation may be fully managed by a quantum computing service on behalf of a customer of the quantum computing service. For example, the quantum computing service may reserve sufficient computing capacity on a virtualized computing service of the service provider network to perform simulation without customer involvement in the details of managing the resources for the simulator. Also, in some embodiments, a quantum computing service may maintain one or more "warm" simulators. The "warm" simulators may include simulators that are pre-configured on compute instances of a virtualized computing service and are already instantiated such that the simulators are ready to perform simulation on behalf of quantum computing service customers on demand. In some embodiments, a quantum computing simulator of a quantum computing service may utilize a comparative rejection sampling technique as described above in regard to FIG. 1 and FIGS. 3A-3B in order to simulate a quantum computer.

In some embodiments, a quantum computing service may include a dedicated console that provides customers access to multiple quantum computing technologies. Furthermore, the quantum computing service may provide a quantum algorithm development kit that enables customers with varying levels of familiarity with quantum circuit design to design and execute quantum circuits. In some embodiments, a console of a quantum computing service may include various application programmatic interfaces (APIs), such as:

(Create/Delete/Update/Get/List)Simulator-Configuration—create, read, update, and delete (CRUD) operations for simulator configuration objects.

(Start/Cancel/Describe)Simulator—used to control each of the user-defined simulator instances.

(List/Describe) quantum processor units (QPUs)—retrieves quantum computer hardware information.

(Create/Cancel/List/Describe)Task—used to manage the lifecycle of individual quantum tasks/quantum objects.

In some embodiments, a quantum algorithm development kit may include a graphical user interface, APIs or other interface to allow customers of a quantum computing service to define quantum objects, such as quantum tasks, algorithms or circuits, using the quantum algorithm development kit.

In some embodiments, a quantum computing service may include a public application programmatic interface (API) that accepts quantum objects submitted by a customer of the quantum computing service. Additionally, the quantum computing service may include a back-end API transport that is non-public. The back-end API transport may enable quantum circuits to be transported from a centralized location that implements the quantum computing service, such as one or more data centers of a service provider network, to an edge computing device at a particular quantum hardware provider location where the quantum circuit is to be executed.

In some embodiments, results of the execution of a quantum circuit on a quantum computer at a quantum hardware provider location may be provided to the edge computing device at the quantum hardware provider location. The edge computing device may automatically transport the results to a secure storage service of the service provider network, where the customer can access the results using the storage service of the service provider network or via a console of the quantum computing service. Also the results transported to the secure storage location may be used for comparison purposes to determine benchmarking data for a given quantum computer/quantum hardware provider.

In some embodiments, the results stored to the secure storage service may be seamlessly used by other services integrated into the service provider network, such as a machine learning service, a database service, an object-based storage service, a block-storage service, a data presentation service (that reformats the results into a more usable configuration), etc. For example, in some embodiments, a machine learning service may be used to optimize a quantum algorithm or quantum circuit. For example, the machine learning service may cause various versions of a quantum algorithm or quantum circuit to be run on a quantum computer via a quantum computing service. The machine learning service may also be provided access to results of running the quantum algorithms or quantum circuits. In some embodiments, the machine learning service may cause the quantum algorithms or quantum circuits to be run on various different quantum computing technology based quantum computers. Based on the results, the machine learning service may determine one or more optimizations to improve the quantum algorithms or quantum circuits.

Figure 4:
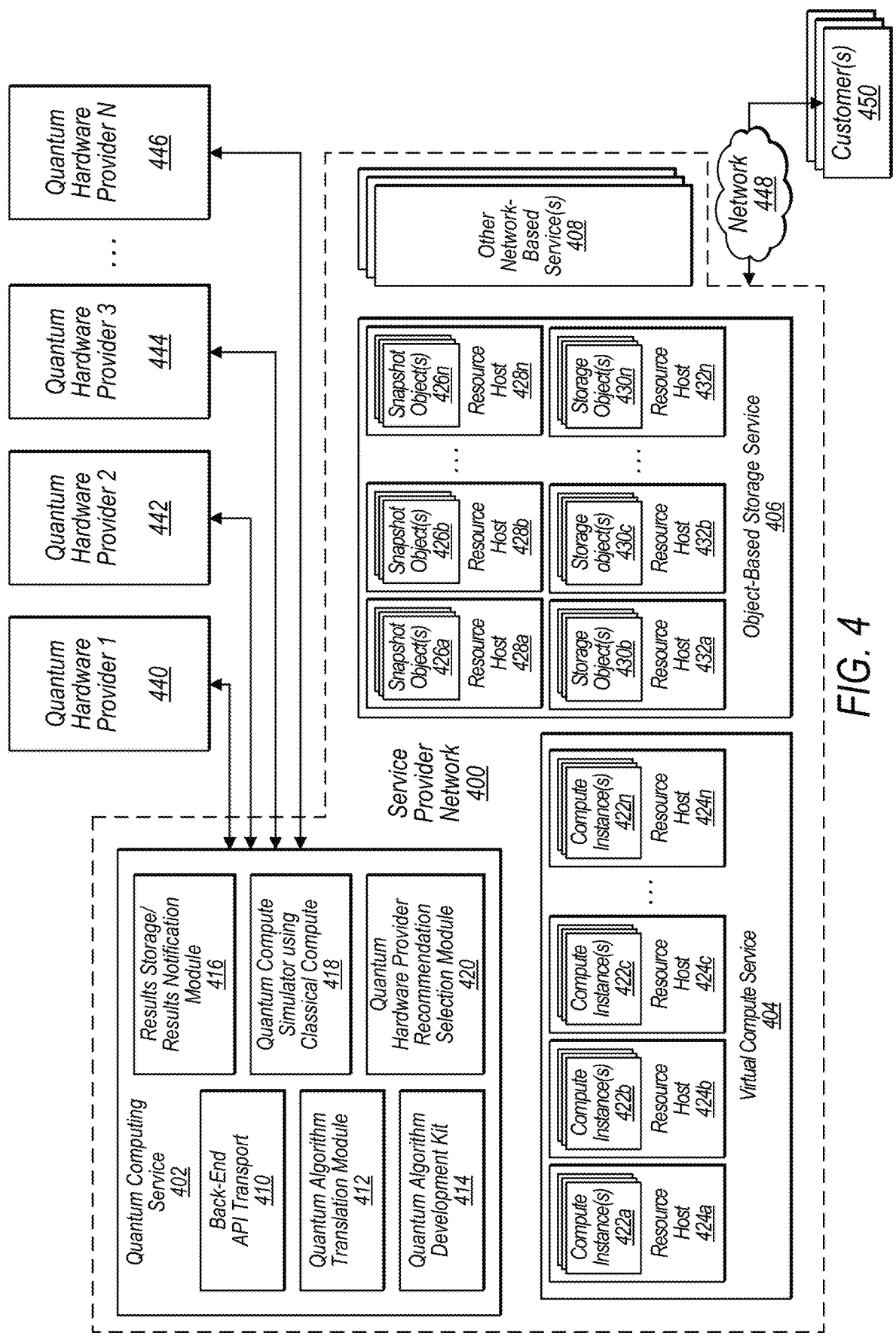
FIG. 4 illustrates a service provider network comprising a quantum computing service, virtual computing service, and storage service, according to some embodiments.

FIG. 4 illustrates a service provider network comprising a quantum computing service, virtual computing service, and storage service, according to some embodiments.

Service provider network 400 includes quantum computing service 402. In some embodiments, service provider network 400 may include data centers, routers, networking devices, etc., such as of a cloud computing provider network. In some embodiments, customers 450 and/or additional customers of service provider network 400 and/or quantum computing service 402, may be connected to the service provider network 400 in various ways, such as via a logically isolated connection over a public network, via a dedicated private physical connection, not accessible to the public, via a public Internet connection, etc.

Figure 6:
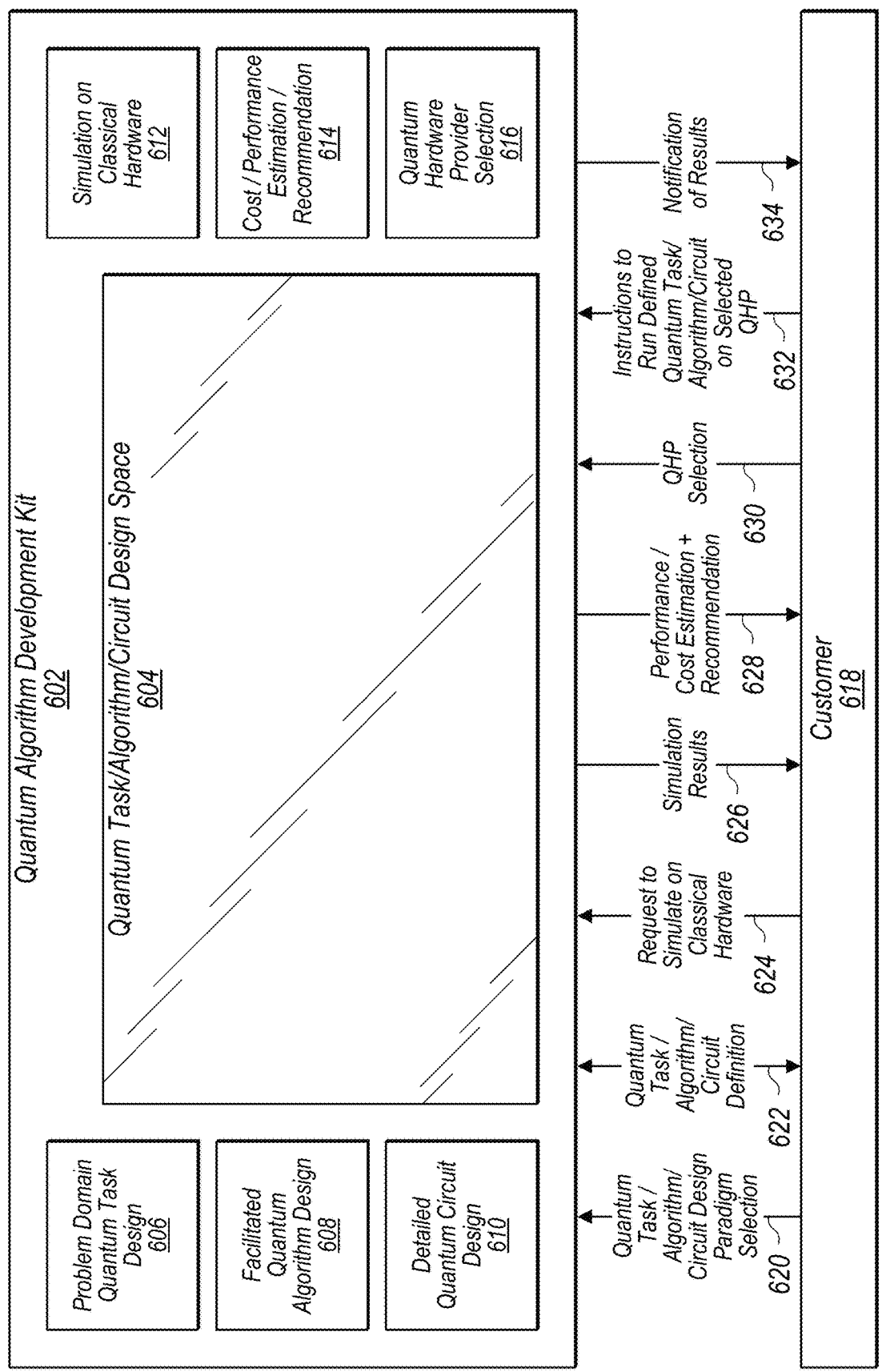
FIG. 6 illustrates an example quantum computing service quantum algorithm development kit interface, according to some embodiments.

In some embodiments, a quantum computing service 402 may include a quantum algorithm development kit 414, such as described in more detail in FIG. 6. Also, quantum computing service 402 may include a translation module 412 as described in more detail in FIG. 8.

Also, quantum computing service 402 is connected to quantum hardware providers 440, 442, 444, and 446. In some embodiments, quantum hardware providers 440, 442, 444, and 446 may offer access to run quantum objects (e.g. quantum algorithms, quantum circuits, etc.) on quantum computers that operate based on various different types of quantum computing technologies or paradigms, such as based on quantum annealing, ion-trap, superconductive materials, photons, etc.

Figure 5:
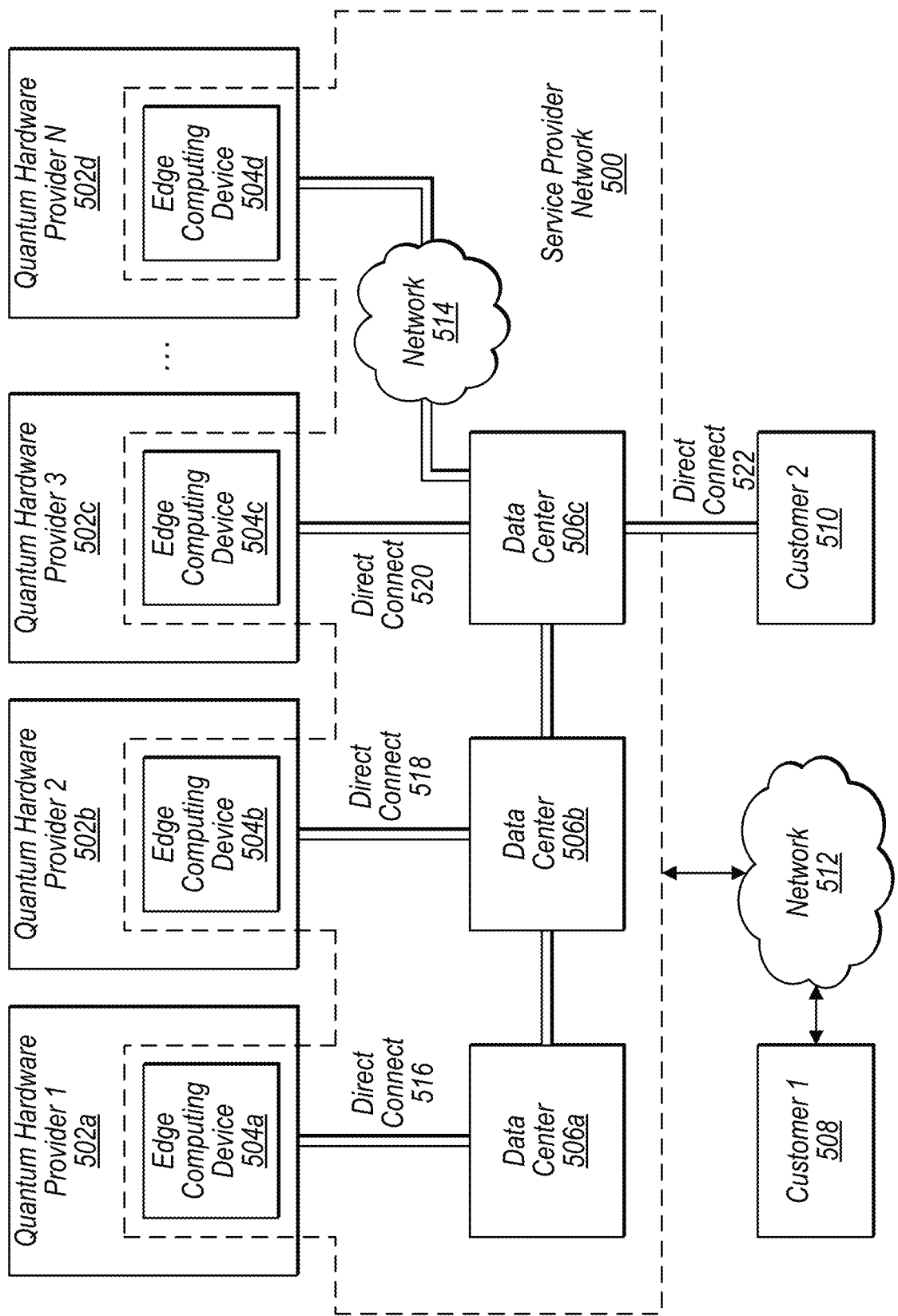
FIG. 5 illustrates an example network architecture for a quantum computing service with edge devices physically located at quantum hardware provider locations, according to some embodiments.

As discussed in more detail in FIG. 5, in some embodiments, a service provider network 400 may be extended to include one or more edge computing devices physically located at quantum hardware provider locations, such as in a facility of quantum hardware providers 440, 442, 444, and 446. Physically locating an edge computing device of a service provider network 400 on premises at a quantum hardware provider facility may extend data security and encryption of the service provider network 400 into the quantum hardware providers 440, 442, 444, and 446 facilities, thus ensuring the security of customer data. Also, physically locating an edge computing device of a service provider network 400 on premises at a quantum hardware provider facility may reduce latency between a compute instance of the service provider network and a quantum computer located at the quantum hardware provider facility. Thus, some applications, such as hybrid algorithms that are sensitive to network latencies may be performed by quantum computing service 402, whereas other systems without co-located classical compute capacity at a hardware provider location may have too high of latencies to perform such hybrid algorithms efficiently.

In some embodiments, quantum computing service 402 includes a back-end API transport module 410. In some embodiments, the back-end API transport module 110 may be primarily implemented on edge computing devices of the quantum computing service that are located at the quantum hardware provider locations (such as edge computing devices 504*a*, 504*b*, 504*c*, and 504*d* illustrated in FIG. 5). Also, in some embodiments, at least some of the back-end API transport functionality may be implemented on the one or more computing devices of the service provider network that implement the quantum computing service (such as computing devices in data center 506*a*, 506*b*, 506*c* illustrated in FIG. 5).

Quantum circuits that have been translated by translation module 412 may be provided to back-end API transport module 410 in order for the translated quantum circuits to be transported to a quantum computer at a respective quantum hardware provider location. In some embodiments, back-end API transport 410 may be a non-public API that is accessible by an edge computing device of service provider network 400, but that is not publicly available. In some embodiments, edge computing devices at the quantum hardware providers 440, 442, 444, and 446 may periodically ping a quantum computer service side interface to the back-end API transport 410 to determine if there are any quantum circuits waiting to be transported to the edge computing device. If so, the edge computing device may perform an API call to the back-end API transport 410 to cause the quantum circuit to be transported over a private connection to the edge computing device and scheduled for execution on a quantum computer. The edge computing device may queue the quantum circuit for execution on a quantum computer of the quantum hardware provider where the edge computing device is located. Also, the edge computing device may have been configured with a quantum machine image that enables the edge computing device to interface with a scheduling application of the quantum hardware provider, where the edge computing device is located, in order to schedule a time slot on the quantum computer of the quantum hardware provider to execute the quantum circuit via the back-end API transport 410.

In some embodiments, results of executing the quantum circuit on the quantum computer at the quantum hardware provider location may be returned to the edge computing device at the quantum hardware provider location. The edge computing device and/or quantum computing service 402 may cause the results to be stored in a data storage system of the service provider network 400. In some embodiments, results storage/results notification module 416 may coordinate storing results and may notify a customer, such as customer 450, that the results are ready from the execution of the customer's quantum object, such as a quantum task, quantum algorithm, or quantum circuit. In some embodiments, results storage/results notification module 416 may cause storage space in a data storage service to be allocated to a customer to store the customer's results. Also, the results storage/results notification module 416 may specify access restrictions for viewing the customer's results in accordance with customer preferences.

In some embodiments, quantum compute simulator using classical hardware 418 of quantum computing service 402, may be used to simulate a quantum algorithm or quantum circuit using classical hardware. For example, one or more virtual machines of a virtual computing service, such as virtual computing service 404 illustrated in FIG. 4, may be instantiated to process a quantum algorithm or quantum circuit simulation job. In some embodiments, quantum compute simulator using classical hardware 418 may fully manage compute instances that perform quantum circuit simulation. For example, in some embodiments, a customer may submit a quantum circuit to be simulated and quantum compute simulator using classical hardware 418 may determine resources needed to perform the simulation job, reserve the resources, configure the resources, etc. A similar process may be used to simulate a benchmark quantum circuit. In some embodiments, quantum compute simulator using classical hardware 418 may include one or more "warm" simulators that are pre-configured simulators such that they are ready to perform a simulation job without a delay typically involved in reserving resources and configuring the resources to perform simulation.

In some embodiments, quantum computing service 402 includes quantum hardware provider recommendation/selection module 420. In some embodiments, quantum hardware recommendation/selection module 420 may make a recommendation to a quantum computing service customer as to which type of quantum computer or which quantum hardware provider to use to execute a quantum object submitted by the customer. Additionally, or alternatively, the quantum hardware provider recommendation/selection module 420 may receive a customer selection of a quantum computer type and/or quantum hardware provider to use to execute the customer's quantum object, such as a quantum task, quantum algorithm, quantum circuit, etc. submitted by the customer or otherwise defined with customer input.

In some embodiments, a recommendation provided by quantum hardware provider recommendation/selection module 420 may be based on one or more characteristics of a quantum object submitted by a customer and one or more characteristics of the quantum hardware providers supported by the quantum computing service 402, such as one or more of quantum hardware providers 440, 442, 444, and 446. For example, benchmarking data for the quantum hardware providers 440, 442, 444, and 446 may be used to generate a recommendation.

In some embodiments, quantum hardware provider recommendation/selection module may make a recommendation based on known data about previously executed quantum objects similar to the quantum object submitted by the customer. For example, quantum computing service 402 may store certain amounts of metadata about executed quantum objects and use such metadata to make recommendations. In some embodiments, a recommendation may include an estimated cost to perform the quantum computing task by each of the first and second quantum hardware providers. In some embodiments, a recommendation may include an estimated error rate for each of the first and second quantum hardware providers in regard to performing the quantum computing task. In some embodiments, a recommendation may include an estimated length of time to execute the quantum computing task for each of the first and second quantum hardware providers. In some embodiments, a recommendation may include various other types of information relating to one or more quantum hardware providers or any combination of the above.

In some embodiments, quantum compute simulator using classical hardware 418, may allow a customer to simulate one or more particular quantum computing technology environments. For example, a customer may simulate a quantum circuit in an annealing quantum computing environment and an ion trap quantum computing environment to determine simulated error rates. The customer may then use this information to make a selection of a quantum hardware provider to use to execute the customer's quantum circuit.

Service provider network 400 as illustrated in FIGS. 4 and 5 may be set up by an entity such as a company or a public sector organization to provide one or more services (such as various types of cloud-based computing or storage) accessible via the Internet and/or other networks to customers 450. Service provider network 400 may include numerous data centers (such as the data centers and network spines described in regard to FIG. 5) hosting various pools of resource hosts, such as collections of physical and/or virtualized computer servers, storage devices, networking equipment and the like (e.g., computing system 1100 described below with regard to FIG. 11), needed to implement and distribute the infrastructure and services offered by the service provider network 400. In some embodiments, service provider network 400 may provide computing resources, such as virtual compute service 404, storage services, such as object-based storage service 406 (which may include various storage types such as object/key-value based data stores or various types of database systems), and/or any other type of network-based services 408. Customers 450 may access these various services offered by provider network 400 via network 448. Likewise network-based services may themselves communicate and/or make use of one another to provide different services. For example, computing resources offered to customers 450 in units called "instances," such as virtual or physical compute instances or storage instances, may make use of other resources, such as data stored in object based data storage service 406 for the compute instances 422a, 422b, 422c and 422c.

As noted above, virtual compute service 404 may offer various compute instances to customers 450. In some embodiments, such compute instances may be instantiated on an edge computing device located at a quantum hardware provider location. For example, in some embodiments, one or more of resource hosts 424a, 424b, 424c, or 424n may be an edge computing device located at a quantum hardware provider location, such as a location of quantum hardware providers 440, 442, 444, and/or 446. Additionally, a virtual compute instance (e.g. virtual machine) may, for example, be implemented on one or more resource hosts 424 that comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 404 in different embodiments, including special purpose computer servers, storage devices, network devices and the like, such as edge computing devices located at a quantum hardware provider location. In some embodiments instance customers 450 or any other user may be configured (and/or authorized) to direct network traffic to a compute instance. In various embodiments, compute instances may attach or map to one or more data volumes provided by a block-based storage service in order to obtain persistent block-based storage for performing various operations.

Compute instances may operate or implement a variety of different platforms, such as general purpose operating systems, application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the customer 450 to access an instance.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc. . . . and (in the case of reserved compute instances) reservation term length.

In some embodiments, an object-based storage service, such as object-based storage service 406, may include a plurality of resource hosts that store snapshot objects and/or other storage objects. For example, object-based storage service 406 includes resource hosts 428a and 428b through 428n storing snapshot objects 426a and 426b through 426n. Additionally, object-based storage service 406 includes resource hosts 432a and 432b through 432n storing storage objects 430a and 430b through 430n. For ease of illustration, snapshot objects 426 and storage objects 430 are illustrated as being stored on different resource hosts of object-based storage service 406. However, in some embodiments a same resource host of an object-based storage service, such as a resource host 428 of object-based storage service 406 may store both storage objects and snapshot objects, for example from a snapshot taken of intermediate results of execution of a hybrid algorithm, from final results from the execution of a of quantum computing object, or from a machine image used by a target volume of a block-based storage service to boot a compute instance, such as one of compute instances 422. Also, a resource host 428 of object-based storage service 406 may store one or more quantum machine images used to boot a compute instance at an edge computing device that coordinates scheduling execution of quantum objects on quantum computer at a quantum hardware provider location where the edge computing device is located.

In addition, service provider network 400 may implement other network-based services 408, which may include various different types of analytical, computational, storage, or other network-based system allowing customers 450, as well as other services of provider network 400 (e.g., a block-based storage service, virtual compute service 404 and/or object-based storage service 406) to perform or request various tasks.

Customers 450 may encompass any type of client configurable to submit requests to network provider 400. For example, a given customer 450 may include a suitable version of a web browser, or may include a plug-in module or other type of code module configured to execute as an extension to or within an execution environment provided by a web browser. Alternatively, a customer 450 may encompass an application such as a database application (or user interface thereof), a media application, an office application or any other application that may make use of compute instances 422, quantum compute service 402, or other network-based service in provider network 400 to perform various operations. In some embodiments, such an application may include sufficient protocol support (e.g., for a suitable version of Hypertext Transfer Protocol (HTTP))

for generating and processing network-based services requests without necessarily implementing full browser support for all types of network-based data. In some embodiments, customers 450 may be configured to generate network-based services requests according to a Representational State Transfer (REST)-style network-based services architecture, a document- or message-based network-based services architecture, or another suitable network-based services architecture. In some embodiments, a customer 450 (e.g., a computational client) may be configured to provide access to a compute instance 422 or data storage object 430 in a manner that is transparent to applications implemented on the customer 450 utilizing computational resources provided by the compute instance 422 or storage provided by the storage object 430.

Customers 450 may convey network-based services requests to service provider network 400 via external network 448. In various embodiments, external network 448 may encompass any suitable combination of networking hardware and protocols necessary to establish network-based communications between customers 450 and service provider network 400. For example, a network 448 may generally encompass the various telecommunications networks and service providers that collectively implement the Internet. A network 448 may also include private networks such as local area networks (LANs) or wide area networks (WANs) as well as public or private wireless networks. For example, both a given customer 450 and service provider network 400 may be respectively provisioned within enterprises having their own internal networks. In such an embodiment, a network 448 may include the hardware (e.g., modems, routers, switches, load balancers, proxy servers, etc.) and software (e.g., protocol stacks, accounting software, firewall/security software, etc.) necessary to establish a networking link between given customer 450 and the Internet as well as between the Internet and service provider network 400. It is noted that in some embodiments, customers 450 may communicate with service provider network 400 using a private network rather than the public Internet, such as a direct connection as described in FIG. 5.

FIG. 5 illustrates an example network architecture for a quantum computing service with edge devices physically located at quantum hardware provider locations, according to some embodiments.

In some embodiments, service provider network 400, as illustrated in FIGS. 4 and 5, may include one or more data centers connected to each other via private or public network connections. Also, edge computing devices located at quantum hardware provider locations may be connected to a service provider network via private or public network connections. For example, service provider network 500 illustrated in FIG. 5 includes data centers 506a, 506b, and 506c that are connected to one another via private physical network links of the service provider network 500. In some embodiments, a customer of the service provider network may also be connected via a private physical network link that is not available to the public to carry network traffic, such as a physical connection at a router co-location facility. For example, customer 510 is connected to a router associated with data center 506c via direct connection 522. In a similar manner, edge computing devices located at quantum hardware provider locations may be connected to a service provider network via a private physical network link that is not available to carry public network traffic.

For example, edge computing device 504a located at quantum hardware provider location 502a is connected to a router at data center 506a via direct connection 516. In a similar manner, edge computing device 504b at quantum hardware provider location 502b is connected to a router at data center 506b via direct connection 518. Also, edge computing device 504c at quantum hardware provider 502c is connected to a router at data center 506c via direct connection 520.

Also, in some embodiments an edge computing device of a service provider network located at a quantum hardware provider location may be connected to the service provider network via a logically isolated network connection over a shared network connection, such as via the Internet or another public network. For example, edge computing device 504d at quantum hardware provider location 502d is connected to data center 506c via a logically isolated network connection via network 514. In a similar manner, in some embodiments a customer, such as customer 508, may be connected to service provider network 500 via public network 512.

In some embodiments, a quantum computing service such as quantum computing service 402, may be implemented using one or more computing devices in any of data centers 506a, 506b, 506c, etc. Also the quantum computing service 402, may provide customers, such as customer 508 or customer 510, access to quantum computers in any of quantum hardware provider locations 502a, 502b, 502c, 502d, etc. For example, a customer may not be restricted to using a quantum hardware provider in a local region where the customer is located. Instead, the customer may be allocated compute instances instantiated on a local edge computing device located at a selected quantum hardware provider location, such that the location of the customer does not restrict the customer's access to various types of quantum computing technology based quantum computers.

Example Quantum Computing Service Interface

FIG. 6 illustrates an example quantum computing service quantum algorithm development kit interface, according to some embodiments.

In some embodiments, a quantum algorithm development kit may support multiple paradigms for defining a quantum circuit. For example, different paradigms may be tailored to customers with different levels of expertise in designing quantum circuits.

For example, a less experienced customer may select a problem-domain based paradigm. For example, the customer may select problem domain quantum task button 606 to display a problem-domain based interface for designing a quantum circuit. The problem-domain based interface may include pre-configured quantum algorithms designed for performing particular functions associated with one or more respective problem domains. A customer of the quantum computing service may select an applicable problem-domain for a problem to be solved by the customer. Also within a given problem-domain, the customer may select one or more pre-configured quantum algorithms from the pre-configured quantum algorithms for the selected problem-domain in order to define a quantum algorithm be performed by the quantum computing service as the quantum computing object, such as a quantum circuit. In some embodiments, the quantum task/algorithm/circuit design space 604 may display a quantum object currently being defined via a given selected design paradigm.

As another example, an intermediate level customer may select a facilitated quantum algorithm design paradigm. The facilitated quantum algorithm design paradigm may be configured such that the quantum computing service 402 facilitates design of a quantum circuit using customer configurable building blocks without the customer being required to understand all the nuances of designing a quantum circuit. For example, a customer may select facilitated quantum algorithm design button 608 to display a quantum algorithm based interface for designing a quantum circuit. The quantum algorithm based interface may include pre-configured quantum logic elements configured to be arranged with one another to form a quantum algorithm, wherein a customer of the quantum computing service selects and/or arranges the pre-configured quantum logic elements to define a particular quantum algorithm to be performed by the quantum computing service as the quantum computing object. In some embodiments, the quantum task/algorithm/circuit design space 604 may display a quantum object currently being defined via the facilitated quantum algorithm design option 608.

Additionally, as another example, a more experienced customer may select a detailed quantum circuit based design paradigm. For example, a quantum circuit design based paradigm may give the customer greater control to customize parameters of a quantum circuit, but may also require the customer to have greater knowledge about quantum computers in order to be able to successfully design a quantum circuit using the quantum circuit based design paradigm. For example, a customer may select detailed quantum circuit design button 610 to display a quantum circuit based interface for designing a quantum circuit. The quantum circuit based interface may include quantum operators and connectors, wherein a customer of the quantum computing service combines the quantum operators and connectors to define a particular quantum circuit to be executed by the quantum computing service 402 as a quantum computing object. In some embodiments, the quantum task/algorithm/circuit design space 604 may display a quantum circuit currently being defined via the detailed quantum circuit design option 610.

Additionally, a quantum algorithm development kit, such as quantum algorithm development kit 602, may include an option to simulate a quantum circuit being designed wherein the simulation is performed using classical hardware, such as compute instances of a virtual compute service as described in FIG. 4. For example, quantum algorithm development kit 602 includes simulation button 612. Also, a quantum algorithm development kit 602 may include a recommendation button, such as cost/performance estimation/recommendation button 614. For example, selecting cost/performance estimation/recommendation button 614 may cause a customer to be provided with an estimate of performance of a quantum task/algorithm/circuit being designed in the design space 604 and also estimated cost to execute the task/algorithm/circuit using various quantum hardware providers. In some embodiments, selecting cost/performance estimation/recommendation button 614 may cause a customer to be provided with performance and cost estimates for executing the task/algorithm/circuit being designed using various quantum computing paradigms, types of quantum computers, or quantum computer providers. Additionally, in some embodiments, selecting cost/performance estimation/recommendation button 614 may cause a customer to be provided with a recommendation as to which quantum computing paradigm, quantum computer type, or quantum hardware provider to select to execute the task/algorithm/circuit being designed.

In some embodiments, a customer may select a quantum computing paradigm, quantum computer type, and/or quantum hardware provider to execute the task/algorithm/circuit being designed via quantum hardware provider selection button 616. For example, the customer may specify to use an annealing quantum computing paradigm, a circuit based quantum computing paradigm, or an analog or continuous variable quantum computing paradigm. As another example, a customer may specify to use an annealing quantum computing technology, an ion-trap quantum computing technology, a superconducting quantum computing technology, a photon based quantum computing technology, etc. Also, some customers may specify a particular quantum hardware provider and may even specify a particular paradigm or technology to use at the particular quantum hardware provider.

For example, a set of interactions exchanged between a customer and a quantum algorithm development kit to design and execute a quantum task/algorithm/circuit may include the interactions shown in 620 through 634.

For example, at 620 customer 618 may select a design paradigm to use to define a quantum object (e.g. quantum task/algorithm/circuit) to be submitted to the quantum computing service for execution on a quantum computer of a quantum hardware provider or a simulator. At 622, customer 618 may provide a definition for the quantum object using the selected design paradigm. For example customer 618 may define the quantum object in the design space 604 using the various tools available for use in the different design paradigms. Also, at 622 the customer 619 may request benchmarking be performed for one or more quantum hardware providers, for example using a benchmark quantum circuit as described herein.

At 624, customer 618 may request to simulate the quantum object defined in design space 604 (and/or a benchmark quantum circuit) by selecting simulation button 612. At 626, the quantum algorithm development kit 602 may provide customer 618 with simulation results. For example, the simulation results may be displayed in design space 604. Also, at 628 the quantum algorithm development kit 602 may provide customer 618 with a performance/cost estimate and/or a recommendation. For example, in response to the customer 618 selecting cost/performance estimation/recommendation button 614. In some embodiments, the results and/or recommendation may include benchmarking data such as respective error rates determined for a set of quantum hardware providers that may be selected to execute the customer's quantum circuit/quantum algorithm/quantum task, etc.

At 630, customer 618 may select a quantum hardware provider and/or quantum computer type to be used to execute the quantum object defined by the customer 618. In some embodiments, in response to the simulation results and/or performance and cost estimate, the customer 618 may return to 622 and modify the quantum object definition and/or request further benchmarking be performed. Also, while not shown, the customer 618 may additionally simulate the defined quantum object on a simulator that simulates performance of the selected quantum hardware provider and/or quantum computer technology type. For example, the simulator may perform simulation that specifically simulates executing the defined quantum object using a particular quantum computing paradigm, a particular quantum computing technology, or a particular quantum hardware provider, etc.

If customer 618 is satisfied with the definition of the customer's quantum object, at 632 the customer 618 may submit the defined quantum object (e.g. quantum task, quantum algorithm, quantum circuit) to be executed on the selected quantum hardware provider. The quantum computing service may translate the quantum object (e.g. quantum task, quantum algorithm, quantum circuit) into a quantum circuit translated into a format suitable to be executed on a quantum computer of the selected quantum hardware provider. In some embodiments, a quantum algorithm development kit may automatically select a quantum hardware provider to execute the customer's quantum object based on characteristics of the quantum object (e.g. quantum task, quantum algorithm, quantum circuit) and properties of the quantum computers at the quantum hardware providers, and/or based on other considerations such as load balancing, costs, etc. Thus, in some embodiments, a customer may simplify define a quantum object and submit the defined quantum object for execution.

Once the quantum object has been executed and results have been generated, the quantum computing service may, at 634, notify customer 618 that the results are available. In some embodiments, such as when executing a hybrid quantum computing algorithm, the results notification may be presented to a classical computer executing a classical computing portion of the hybrid algorithm and a customer may be notified when the hybrid algorithm has completed, but not necessarily be notified for each step of the hybrid algorithm that generates intermediate quantum computing results.

Figure 7A:
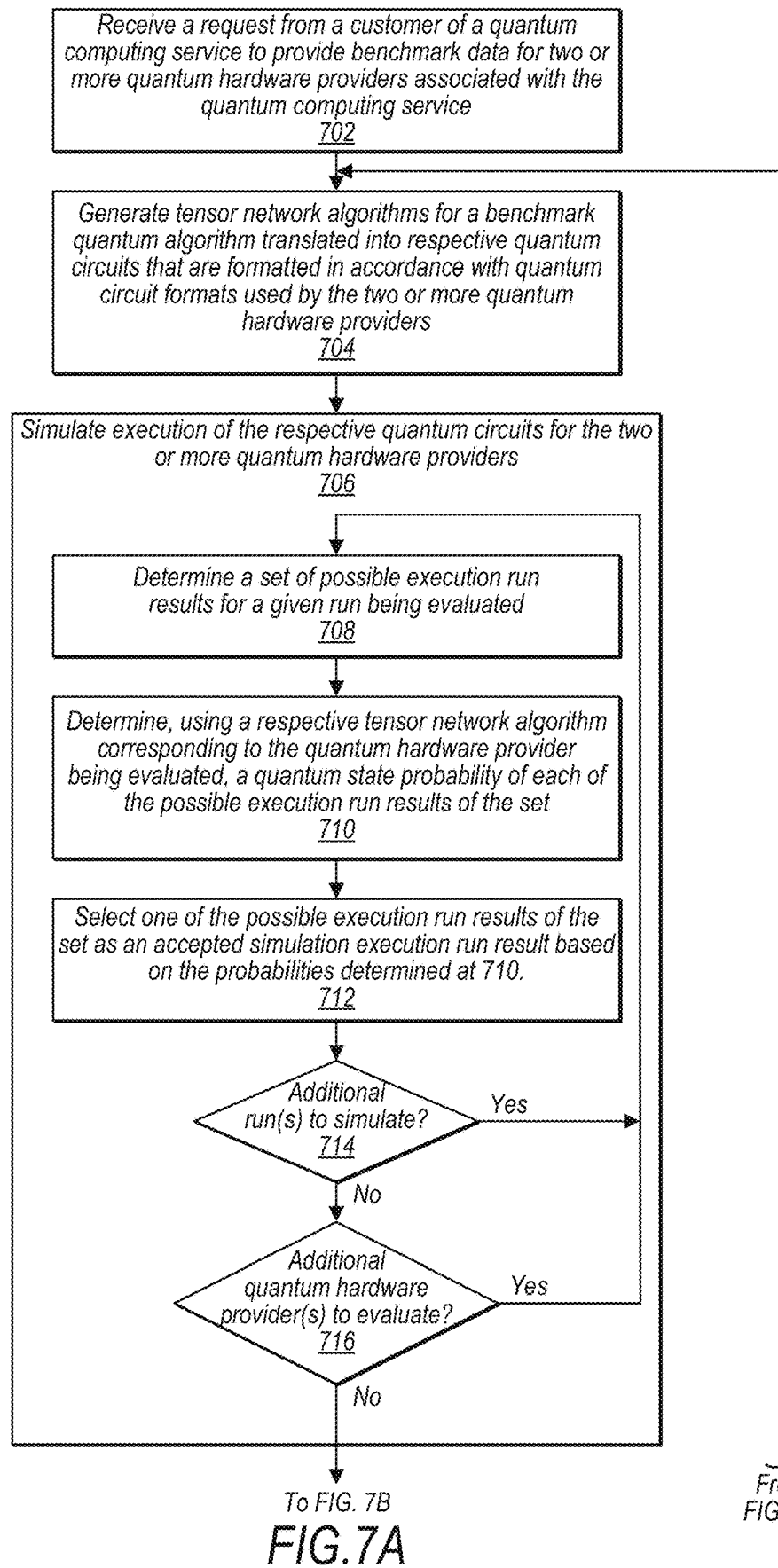
FIGS. 7A-7B illustrate a process of determining benchmarking data by simulating and executing a benchmark quantum circuit for two or more quantum computers using simulated results generated using a comparative rejection sampling technique, according to some embodiments.
Figure 7B:
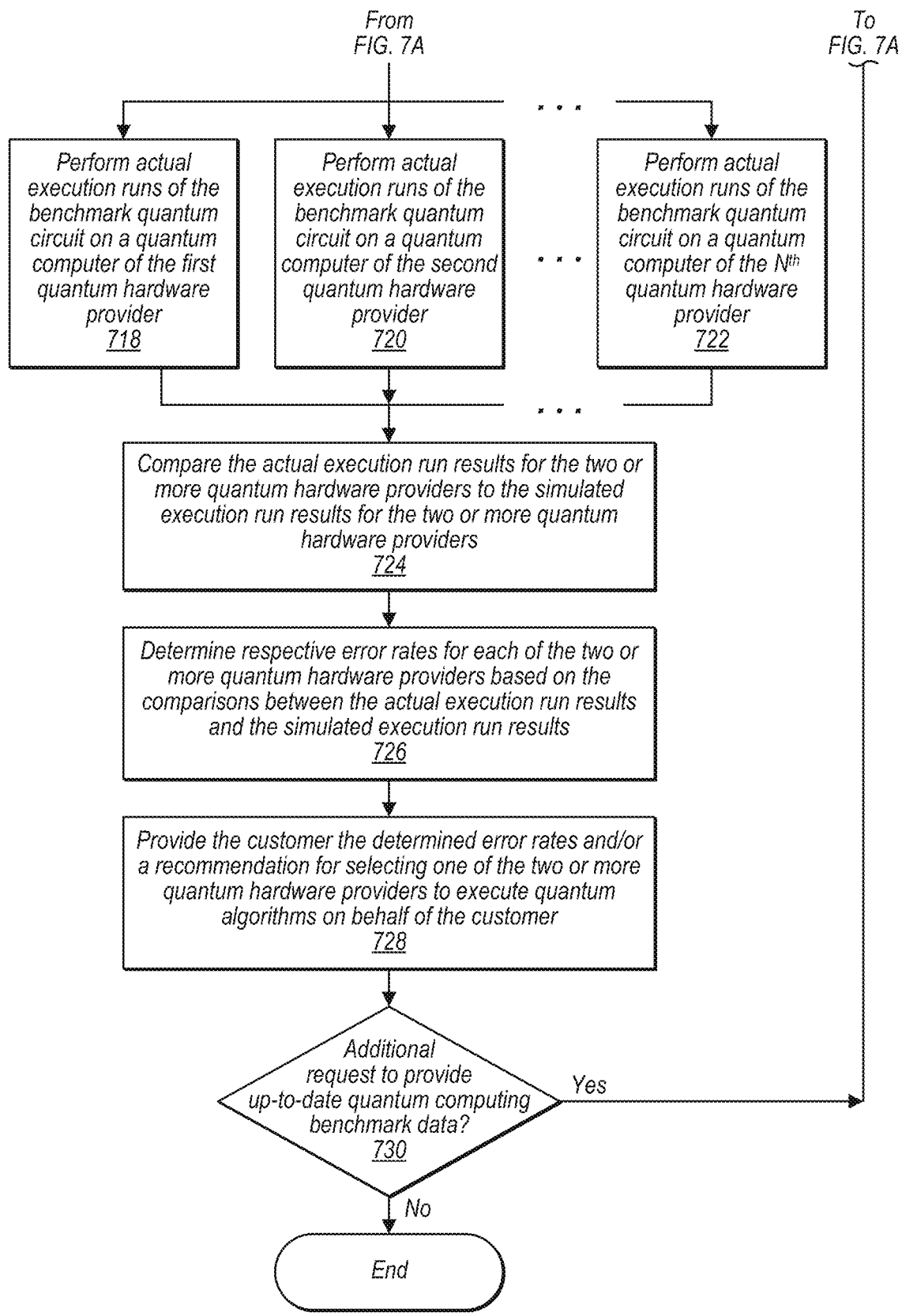

More Detailed Process for Determining Benchmark Data Using a Comparative-Rejection Sampling Technique FIGS. 7A-7B illustrate a process of determining benchmarking data by simulating and executing a benchmark quantum circuit for two or more quantum computers using simulated results generated using a comparative rejection sampling technique, according to some embodiments.

At 702, a quantum computing service/quantum simulator receives a request from a customer to provide benchmark data for two or more quantum hardware providers associated with the quantum computing service.

At 704, the quantum computing service generates tensor network algorithms for a benchmark quantum algorithm translated into respective quantum circuits that are formatted in accordance with quantum circuit formats used by the two or more quantum hardware providers.

At 706, the quantum computing service simulates execution of the respective translated benchmark quantum circuits. In order to perform the simulation, at 708, the quantum simulator, as part of a comparative rejection sampling technique, selects a set of possible execution run results for a first (or next) given run being evaluated.

At 710, the quantum computing service determines for each of the possible execution run results of the set, a corresponding probability amplitude indicating a probability that the quantum circuit being simulated would be in a state associated with the respective possible execution run result.

At 712, the quantum computing service and/or the quantum simulator selects one of the possible execution run results of the set as the accepted execution run result for the given run being evaluated. In some embodiments, the selected execution run result may be selected from the set based on weighted normalized probabilities. Also, in some embodiments, other methods may be used to select an execution run result from the set, such as selecting the possible execution run result with the greatest probability amplitude.

At 714, the quantum computing service and/or the quantum simulator determines whether there are additional runs to simulate for the given quantum hardware provider being evaluated. If so, the process reverts to 708 and is repeated for the next run to be simulated for the given quantum hardware provider being evaluated.

If there are not additional runs to be simulated for the given hardware provider being evaluated, at 716, it is determined if another quantum hardware provider is to be evaluated as part of the benchmarking. If so a similar process is performed for the other quantum hardware provider. In some embodiments, simulation of multiple quantum hardware providers may be performed concurrently using multiple ones of compute instances 422 of virtual compute service 404.

At 718, 720, and 722 translated versions of the benchmark quantum circuit are actually executed on quantum computers of the quantum hardware providers being evaluated. For example, edge computing devices 504 as shown in FIG. 5 may coordinate executing the translated benchmark quantum circuits on respective quantum computers of respective quantum hardware providers. In some embodiments, the actual executions of 718, 720, and 722 may be performed concurrently with the simulated executions determined at 706. For example, in some embodiments, translated benchmark quantum circuits may be added to a queue of quantum circuits to be executed at a given quantum hardware provider while simulated results are also being determined using classical computer hardware of a service provider network that implements the quantum computing service.

At 724, the actual execution run results and the simulated execution run results for each of the quantum hardware providers being evaluated are compared. At 726, respective error rates for each of the quantum hardware providers being evaluated are determined based on the comparisons performed at 724.

At 728, the customer requesting the benchmarking is provided with the determined error rates for the quantum hardware providers being evaluated and/or is provided a recommendation for selecting one of the quantum hardware providers being evaluated as a quantum hardware provider to execute a quantum circuit on behalf of the customer.

At 730, it is determined whether updated benchmarking data is desired for the quantum hardware provider selected and/or the quantum hardware providers from which a customer may select. If so the process is repeated to determine updated benchmarking data. If not, the process ends.

Examples of Translation from an Intermediate Representation to a Quantum Computing Technology Specific Representation In some embodiments, a quantum computing service may define quantum objects using an intermediate representation and then translate the quantum objects into quantum hardware specific quantum circuit representations before making the quantum circuits available to be transported to an edge computing device at a quantum hardware provider location for execution on a quantum computer of the quantum hardware provider. Also, in some embodiments, a quantum object defined in an intermediate representation may be translated into a quantum hardware specific quantum circuit representation that is to be simulated to provide quantum hardware provider specific simulation results.

For example not all gates may be supported by each quantum computing technology supported by the quantum computing service. Thus the quantum computing service may translate quantum operators supported in a particular quantum computing technology into an equivalent representation in another quantum computing technology. In some embodiments, in order to provide a representation with similar functionality, a single gate in a first quantum computing technology may be translated into a sequence of gates or quantum operators in a second quantum computing technology. Additionally, after substituting quantum operators for equivalent representations, a quantum computing service may perform one or more operations to determine if a quantum operator count of the translated quantum circuit representation can be reduced without significantly affecting functionality. For example some sets of gates may be replaced with fewer gates.

Also, in some embodiments a quantum computing service may translate an intermediate representation of a quantum object into a representation to be executed on a quantum computer simulator. In some embodiments, a simulator may support a defined set of quantum operators, which may vary from a set of quantum operators supported by a particular quantum computing technology quantum computer.

In some embodiments, a quantum computing service may support translation of customer defined gates into a set of one or more quantum operators available in a particular quantum computing technology or available at a particular quantum hardware provider.

In some embodiments, a quantum computing service may provide a customer with access to a translated quantum circuit representation as it is to be executed at the quantum hardware provider. This may assist the customer with troubleshooting and designing the customer's quantum circuit.

In some embodiments, a quantum computing service may further include hardware specific optimizers that optimize the translated quantum circuits based on characteristics of a particular type of quantum computing hardware.

In some embodiments, a quantum computing service may translate a quantum object in an intermediate representation into two or more quantum hardware specific quantum circuit representations. For example, a customer may desire to execute the quantum object using two different types of quantum computers. In such a case, the quantum computing service may automatically translate the customer's quantum object into a first and a second quantum circuit representation, each suitable for a respective one of the two different types of quantum computers.

FIG. 8 illustrates example steps that may be performed to translate a quantum task, algorithm, or circuit from an intermediate representation to a quantum computing technology specific representation, according to some embodiments.

At 802, a translation module of a quantum computing service, such as translation module 412 of quantum computing service 402, identifies portions of the quantum computing task/algorithm/circuit corresponding to quantum operators.

At 804, the translation module substitutes quantum operators in the intermediate representation for quantum operators corresponding to the quantum computing technology of selected quantum hardware provider.

At 806, the translation module performs one or more quantum circuit optimizations to reduce an overall number of quantum operators in the translated quantum circuit.

At 808, the translation module and/or the simulation module generates a tensor network algorithm based on the translated quantum circuit.

At 810, the translation module provides the translated quantum circuit to a back-end API transport for delivery to an edge computing device at the selected quantum hardware provider.

Figure 9:
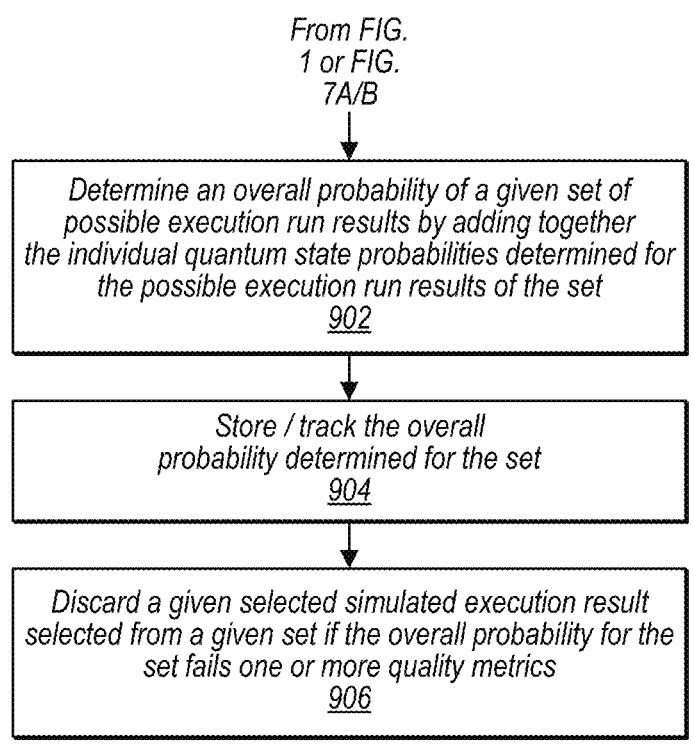
FIG. 9 illustrates additional process steps for tracking overall quality metrics for a set of possible execution run results used in a comparative rejection sampling technique and optionally discarding selected samples from sets with low overall quality, according to some embodiments.

FIG. 9 illustrates additional process steps for tracking overall quality metrics for a set of possible execution run results used in a comparative rejection sampling technique and optionally discarding selected samples from sets with low overall quality, according to some embodiments.

As part of a comparative rejection sampling technique as described in FIGS. 1 and 7A/B the determined probabilities for each set of possible execution run results may be tracked or stored. In some embodiments, the determined probabilities for each set may be used to determine a quality score for the accepted sample selected from that set. In some embodiments, a sample from a set with an overall quality score for the set that is below a minimum quality threshold may be discarded.

For example, at 902 an overall probability of a given set of possible execution run results is determined by adding together the individual quantum state probabilities determined for the possible execution run results of the set.

At 904, the overall probability/quality metric for the sample selected for the set is stored and/or tracked. In some embodiments, the overall probability/quality metric for the sample selected from the set may be stored and/or tracked for multiple sets and selected samples.

Optionally, at 906, a sample selected from a set with a low quality metric may be discarded. For example, in some embodiments, if an overall probability of the samples of a given set is less than a threshold value, the sample set may be discarded.

Figure 10:
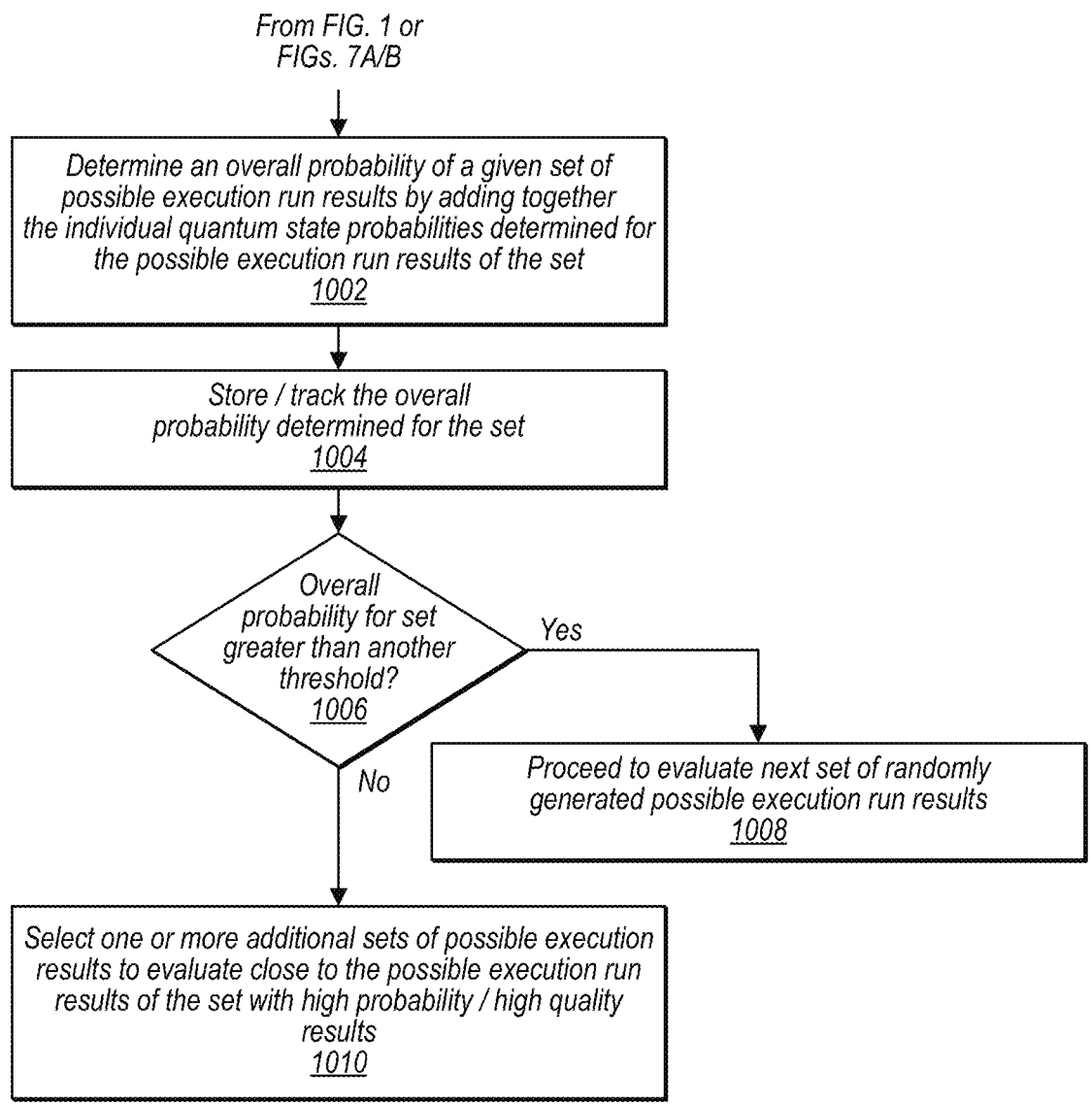
FIG. 10 illustrates additional process steps for selecting clustered possible execution run results in a region of a state domain determined to have high quality samples, according to some embodiments.

FIG. 10 illustrates additional process steps for selecting clustered possible execution run results in a region of a state domain determined to have high quality samples, according to some embodiments.

In some embodiments, samples to be included in a set of samples to be evaluated using a comparative rejection sampling technique may be strategically selected for a cluster determined to have high probability scores. For example for a quantum circuit with a narrow distribution, such as shown in FIG. 2G, once a high probability sample is determined, such as the accepted sample, a Markov-Chain Monte Carlo (MCMC) method may be used to strategically select samples to include as possible execution run results that are clustered around one or more samples with high probability amplitudes.

For example, at 1002 an overall probability of a given set of possible execution run results is determined by adding together the individual probability amplitudes of the possible execution run results.

At 1004, the overall probability of the given set is stored or tracked. And, at 1006, the overall probability/quality of the sample set is compared to another threshold, such as a threshold indicating a high probability sample set. If the threshold is met, at 1010 additional samples for subsequent sample sets are selected at locations close to the sample set with high probabilities. If not, at 1008 a next sample set is randomly selected. For example, a sample close to the selected sample may have a quantum state value near the quantum state value of the samples of the set with high probabilities. As an example, a small value may be added to or subtracted from the quantum state value (e.g. run result) with the high probability to generate another possible execution run result close to the high probability execution run result or high probability set of possible execution run results.

Illustrative Computer System

Figure 11:
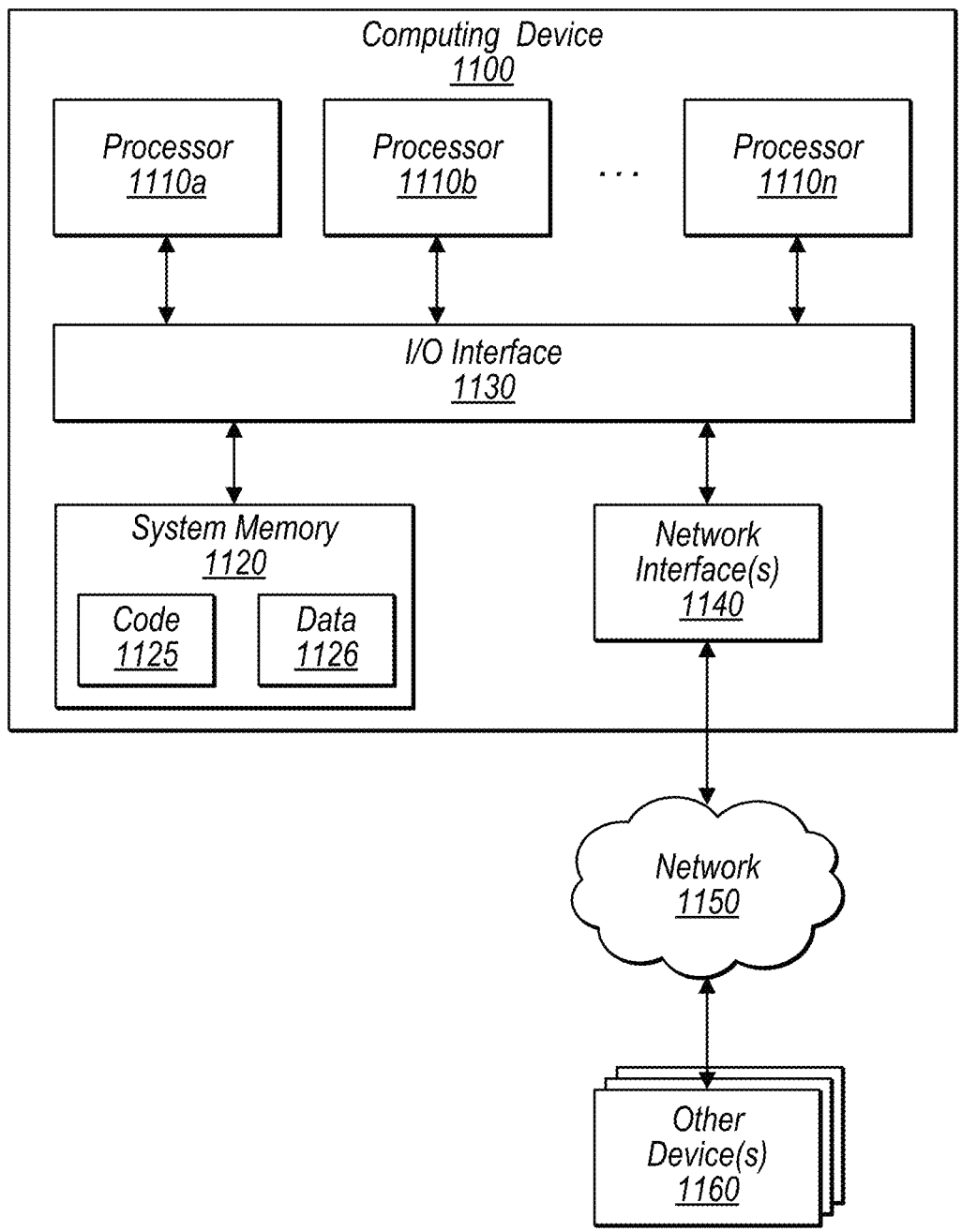
FIG. 11 is a block diagram illustrating an example computing device that may be used in at least some embodiments.

FIG. 11 is a block diagram illustrating an example computing device that may be used in at least some embodiments.

FIG. 11 illustrates such a general-purpose computing device 1100 as may be used in any of the embodiments described herein. In the illustrated embodiment, computing device 1100 includes one or more processors 1110 coupled to a system memory 1120 (which may comprise both non-volatile and volatile memory modules) via an input/output (I/O) interface 1130. Computing device 1100 further includes a network interface 1140 coupled to I/O interface 1130.

In various embodiments, computing device 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. In some implementations, graphics processing units (GPUs) may be used instead of, or in addition to, conventional processors.

System memory 1120 may be configured to store instructions and data accessible by processor(s) 1110. In at least some embodiments, the system memory 1120 may comprise both volatile and non-volatile portions; in other embodiments, only volatile memory may be used. In various embodiments, the volatile portion of system memory 1120 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1120 as code 1125 and data 1126.

In some embodiments, I/O interface 1130 may be configured to coordinate I/O traffic between processor 1110, system memory 1120, and any peripheral devices in the device, including network interface 1140 or other peripheral interfaces such as various types of persistent and/or volatile storage devices. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing device 1100 and other devices 1160 attached to a network or networks 1150, such as other computer systems or devices as illustrated in FIG. 1 through FIG. 10, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may represent one embodiment of a computer-accessible medium configured to store at least a subset of program instructions and data used for implementing the methods and apparatus discussed in the context of FIG. 1 through FIG. 10. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1100 via I/O interface 1130. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1100 as system memory 1120 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 1140. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD- ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system comprising:
one or more computing devices configured to implement a quantum computing service, wherein the quantum computing service is configured to:
determine benchmark data for two or more quantum computing hardware providers associated with the quantum computing service; and
provide, to a customer of the quantum computing service, the benchmark data for the two or more quantum computing hardware providers for use in selecting a quantum hardware provider to execute a quantum circuit on behalf of the customer,
wherein to determine the benchmark data, the one or more computing devices are configured to, for each respective one of the two or more quantum computing hardware providers:
generate a tensor network algorithm modelling a benchmark quantum circuit to be executed on a quantum computer of the respective quantum computing hardware provider;
simulate, using the generated tensor network algorithm, a plurality of execution run results for a plurality of execution runs of the benchmark quantum circuit;
cause a plurality of actual execution runs of the benchmark quantum circuit to be performed on the quantum computer of the respective quantum computing hardware provider; and
determine an error rate for the quantum computer of the respective quantum computing hardware provider based on the simulated execution run results and the actual execution run results on the quantum computer of the respective quantum computing hardware provider;
wherein to simulate the plurality of execution run results, the one or more computing devices are configured to, for each of the simulated execution runs:
determine a set of possible execution run results for the benchmark quantum circuit executed on the quantum computer of the respective quantum computing hardware provider for the respective execution run;
determine respective probabilities for each of the possible execution run results for the respective execution run, wherein the probabilities are determined based on applying each of the respective possible execution run results to the tensor network algorithm for the respective quantum computing hardware provider to determine the respective probabilities; and
select, as a simulated execution run result for the simulated execution run, one of the set of possible execution run results from the set of possible execution run results, wherein the selected simulated execution run result is selected from the set based on its determined probability relative to the determined probabilities of the other possible execution run results of the set.

2. The system of claim 1, wherein a number of possible execution run results required to be evaluated to determine an accepted simulated execution run result is bound by a number of possible execution run results included in the set.

3. The system of claim 2, wherein the number of possible execution run results required to be evaluated to determine an accepted simulated execution run result is 10 or fewer.

4. The system of claim 2, wherein the number of possible execution run results required to be evaluated to determine an accepted simulated execution run result is 100 or fewer.

5. A method of simulating an execution run result for a quantum computer, the method comprising:
determining a set of possible execution run results for a simulation of a quantum circuit executed using the quantum computer;
determining respective probabilities for each of the possible execution run results based on applying each of the respective possible execution run results to a tensor network algorithm that models the quantum circuit to be executed on the quantum computer; and
selecting, as a simulated execution run result, one of the set of possible execution run results, wherein the selected simulated execution run result is selected from the set based on its determined probability relative to the determined probabilities of the other possible execution run results of the set which are rejected.

6. The method of claim 5, wherein the tensor network algorithm models a benchmark quantum circuit to be executed by the quantum computer, the method further comprising:
translating the benchmark quantum circuit defined in a non-hardware specific intermediate representation into a quantum circuit format supported by the quantum computer; and
generating the tensor network algorithm for the quantum computer based on the benchmark quantum circuit translated into the quantum circuit format supported by the quantum computer.

7. The method of claim 6, further comprising:
receiving quantum circuit format updates for the quantum computer; and
repeating said translating the benchmark quantum circuit and said generating the tensor network algorithm using an updated quantum circuit format for the quantum computer.

8. The method of claim 6, further comprising:
repeating, for a plurality of execution runs, said determining a set of possible execution run results, said determining respective probabilities for each of the possible execution run results, and said selecting, as a simulated execution run result, one of the set of possible execution run results;
comparing a plurality of simulated execution run results for the plurality of execution runs of the benchmark quantum circuit on the quantum computer to a plurality of actual execution run results of the benchmark quantum circuit on the quantum computer; and
determining an error rate for the quantum computer based on the comparison of the simulated execution run results to the actual execution run results on the quantum computer.

9. The method of claim 8, further comprising:
determining an error rate for one or more other quantum computers, wherein said determining the error rate for the one or more other quantum computers comprises:
repeating, for a plurality of execution runs:
determining a set of possible execution run results for a respective one of the one or more other quantum computers;
determining respective probabilities for each of the possible execution run results for the other respective quantum computer based on applying each of the respective possible execution run results to a tensor network algorithm that models the other respective quantum computer; and
selecting, as a simulated execution run result for the respective execution run, one of the set of possible execution run results from the set of possible execution run results, wherein the selected simulated execution run result is selected from the set based on its determined probability relative to the determined probabilities of the other possible execution run results of the set which are rejected;
comparing a plurality of simulated execution run results for the plurality of execution runs of the benchmark quantum circuit on the one or more other quantum computer to a plurality of actual execution run results of the benchmark quantum circuit on the one or more other quantum computers; and
determining respective error rates for the one or more other quantum computers based on the respective comparisons of the simulated execution run results to the actual execution run results on the one or more other quantum computers.

10. The method of claim 9, further comprising:
providing the determined respective error rates for the quantum computer and the one or more other quantum computers to a customer of a quantum computing service; or
providing the customer of the quantum computing service a recommendation for a quantum hardware provider to select to execute a quantum circuit on behalf of the customer based on the determined respective error rates for the quantum computer and the one or more other quantum computers, wherein the quantum computer and the one or more other quantum computers are operated by different quantum hardware providers associated with the quantum computing service.

11. The method of claim 5, wherein a number of possible execution run results required to be evaluated to determine an accepted simulated execution run result is bound by a number of possible execution run results included in the set.

12. The method of claim 5, wherein the one of the set of possible execution run results selected as the simulated execution run result from the set of possible execution run results is selected from the set based on:
a random selection from probability weighted ones of the possible execution run results of the set.

13. The method of claim 5, wherein the one of the set of possible execution run results selected as the simulated execution run result from the set of possible execution run results is selected from the set based on:
the selected possible execution run result having a greater determined probability than the other ones of the set of possible execution run results.

14. The method of claim 5, further comprising:
determining an overall probability of the set of possible probabilities determined for the set of possible execution run results; and
determining a quality of the simulated execution run result based on the overall probability for the set.

15. The method of claim 14, further comprising:
determining overall probabilities for other sets of possible probabilities determined for other sets of possible execution run results for other simulated runs of a benchmark circuit on the quantum computer;
determining respective qualities of the simulated execution run results for the other runs based on the determined respective overall probabilities; and
discarding the simulated execution run result if the determined quality for the simulated execution run result deviates from the determined qualities for the other runs by more than a threshold amount.

16. The method of claim 14, further comprising:
in response to determining the quality of the simulated execution run result is equal to or greater than a quality threshold,
simulating execution run results close to the simulated execution run result with the determined quality equal to or greater than the quality threshold.

17. The method of claim 16, wherein a markov-chain monte-carlo method is used to simulate the execution run results close to the simulated execution run result.

18. One or more non-transitory computer-readable media storing program instructions, that when executed on or across one or more processors, cause the one or more processors to:
determine a set of possible execution run results for a simulation of an execution of a quantum circuit;
determine respective probabilities for each of the possible execution run results based on applying each of the respective possible execution run results to a tensor network algorithm that models the quantum circuit in a format supported by a particular quantum hardware provider; and
select, as a simulated execution run result, one of the set of possible execution run results, wherein the selected simulated execution run result is selected from the set based on its determined probability relative to the determined probabilities of the other possible execution run results of the set which are rejected.

19. The one or more non-transitory computer-readable media of claim 18, wherein a number of possible execution run results required to be evaluated to determine an accepted simulated execution run result is 10 or fewer.

20. The one or more non-transitory computer-readable media of claim 18, wherein a number of possible execution run results included in the set is determined based on a fidelity of a type of quantum computer used by the particular quantum hardware provider.

* * * * *